(12) United States Patent
Park et al.

(10) Patent No.: US 11,997,286 B2
(45) Date of Patent: May 28, 2024

(54) DEVICE AND METHOD FOR ENCODING MOTION VECTOR, AND DEVICE AND METHOD FOR DECODING MOTION VECTOR

(71) Applicant: SAMSUNG ELECTRONICS CO., LTD., Suwon-si (KR)

(72) Inventors: Minwoo Park, Suwon-si (KR); Minsoo Park, Suwon-si (KR); Kwangpyo Choi, Suwon-si (KR); Kiho Choi, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 89 days.

(21) Appl. No.: 17/675,410

(22) Filed: Feb. 18, 2022

(65) Prior Publication Data

US 2022/0174288 A1  Jun. 2, 2022

Related U.S. Application Data

(63) Continuation of application No. PCT/KR2021/001070, filed on Jan. 27, 2021.

(30) Foreign Application Priority Data

Apr. 10, 2020  (KR) .................. 10-2020-0044297
Jan. 26, 2021  (KR) .................. 10-2021-0011031

(51) Int. Cl.
*H04N 19/52* (2014.01)
*H04N 19/105* (2014.01)
(Continued)

(52) U.S. Cl.
CPC ......... *H04N 19/139* (2014.11); *H04N 19/105* (2014.11); *H04N 19/11* (2014.11);
(Continued)

(58) Field of Classification Search
None
See application file for complete search history.

(56) References Cited

U.S. PATENT DOCUMENTS 9,106,924 B2  8/2015  Lee et al.
9,900,620 B2  2/2018  Lee et al.
(Continued)

FOREIGN PATENT DOCUMENTS

JP  2017-85637 A  5/2017
KR  10-2013-0067874 A  6/2013
(Continued)

OTHER PUBLICATIONS

Communication dated Dec. 20, 2022 issued by Intellectual Property India in counterpart Indian Patent Application No. 202247057426.
(Continued)

*Primary Examiner* — Samuel D Fereja
(74) *Attorney, Agent, or Firm* — Sughrue Mion, PLLC

(57) ABSTRACT

A method, performed by an image decoding apparatus, of decoding a motion vector, including obtaining information indicating a motion vector resolution of a current block from a bitstream; selecting a first neighboring block from among neighboring blocks adjacent to the current block, by using the obtained information indicating the motion vector resolution of the current block; based on the current block referring to a reference picture in a list 0, and the first neighboring block referring to the reference picture in the list 0, determining a prediction motion vector of the current block using a motion vector of the first neighboring block; based on the current block referring to the reference picture in the list 0 and the first neighboring block referring to a reference picture in a list 1, selecting a motion vector of a second neighboring block among the neighboring blocks as a basic motion vector, and determining the prediction motion vector of the current block using the determined (Continued)

basic motion vector; and determining a motion vector of the current block using the prediction motion vector of the current block.

4 Claims, 30 Drawing Sheets

(51) Int. Cl.
  *H04N 19/11* (2014.01)
  *H04N 19/139* (2014.01)
  *H04N 19/172* (2014.01)
  *H04N 19/176* (2014.01)

(52) U.S. Cl.
  CPC ......... *H04N 19/172* (2014.11); *H04N 19/176* (2014.11); *H04N 19/52* (2014.11)

(56) References Cited

U.S. PATENT DOCUMENTS

| | | | |
|---|---|---|---|
| 10,531,113 B2 | 1/2020 | Lee et al. | |
| 10,575,012 B2 | 2/2020 | Park et al. | |
| 10,645,414 B2 | 5/2020 | Alshin et al. | |
| 2015/0245049 A1 | 8/2015 | Lee et al. | |
| 2017/0238012 A1 | 8/2017 | Min et al. | |
| 2018/0213227 A1 | 7/2018 | Lim et al. | |
| 2018/0324456 A1 | 11/2018 | Alshin et al. | |
| 2019/0320195 A1 | 10/2019 | Lim et al. | |
| 2020/0107043 A1 | 4/2020 | Hung et al. | |
| 2020/0177908 A1 | 6/2020 | Lee et al. | |
| 2020/0195966 A1 | 6/2020 | Lee et al. | |
| 2021/0112268 A1* | 4/2021 | Ko | H04N 19/593 |
| 2021/0127131 A1* | 4/2021 | Lim | H04N 19/176 |
| 2022/0174288 A1 | 6/2022 | Park et al. | |

FOREIGN PATENT DOCUMENTS

| | | |
|---|---|---|
| KR | 10-2014-0043032 A | 4/2014 |
| KR | 10-2018-0067598 A | 6/2018 |
| KR | 10-2297479 B1 | 9/2021 |
| RU | 2 530 252 C1 | 10/2014 |
| SG | 195596 A1 | 12/2013 |
| WO | 2014/051320 A1 | 4/2014 |
| WO | 2016/183224 A1 | 11/2016 |
| WO | 2019/054591 A1 | 3/2019 |
| WO | 2019/235896 A1 | 12/2019 |
| WO | 2020/050695 A1 | 3/2020 |

OTHER PUBLICATIONS

Communication dated May 28, 2021 issued by the Korean Intellectual Property Office in counterpart Korean Application No. 10-2021-0011031.
Communication dated Feb. 25, 2021 issued by the Korean Intellectual Property Office in counterpart Korean Application No. 10-2021-0011031.
Communication dated Apr. 29, 2021 issued by the International Searching Authority in counterpart Application No. PCT/KR2021/001070 (PCT/ISA/220, PCT/ISA/210, and PCT/ISA/237).
Benjamin Bross et al., "Versatile Video Coding (Draft 8)", Joint Video Experts Team (JVET) of ITU-T SG 16 WP 3 and ISO/IEC JTC 1/SC 29/WG 11, Document: JVET-Q2001-vE, Jan. 2020, 513 pages total.
Hongbin Liu et al., "CE2: Adaptive Motion Vector Resolution for Affine Inter Mode (Test 2.1.2)", Joint Video Experts Team (JVET) of ITU-T SG 16 WP 3 and ISO/IEC JTC 1/SC 29/WG 11, Document: JVET-M0246_r1, Jan. 9, 2019, 10 pages.
S. Corrado et al., "Improving H.264 Performances by Quantization of Motion Vectors", 2009 Picture Coding Symposium, May 2009, 4 pages, DOI: 10.1109/PCS.2009.5167401, URL: https://perso.telecom-paristech.fr/cagnazzo/pub/c20.pdf.
Communication dated Jun. 17, 2023 by the Korean Intellectual Property Office for Korean Patent Application No. 10-2021-0111871.
Communication dated Aug. 7, 2023 by the IP Australia for Australian Patent Application No. 2021253227.
Communication dated Jun. 16, 2023 by the Intellectual Property India for Indian Patent Application No. 202348028582.
Communication dated Jun. 1, 2023 by the Russian Federal Service for Intellectual Property for Russian Patent Application No. 2022128113.
Office Action issued on Nov. 2, 2023 by the Canadian Patent Office in corresponding CA Patent Application No. 3171107.
Office Action issued on Oct. 31, 2023 by the Russian Patent Office in corresponding RU Patent Application No. 2023119136.
Communication issued Feb. 8, 2024 by the European Patent Office in European Patent Application No. 21784752.4.
Sri Nitchith Akula et al., "Description of SDR, HDR and 360° video coding technology proposal considering mobile application scenario by Samsung, Huawei, GoPro, and HiSilicon", Joint Video Exploration Team (JVET) of ITU-T SG 16 WP 3 and ISO/IEC JTC 1/SC 29/WG 11, 10th Meeting: San Diego, US, Apr. 10-20, 2018, Document: JVET-J0024_v2 (Apr. 14, 2018), 139 pages.
Communication issued on Mar. 21, 2024 by the Korean Intellectual Property Office for Korean Patent Application No. 10-2021-0111871.
Communication issued on Mar. 19, 2024 by the Japanese Patent Office for Japanese Patent Application No. 2022-561098.
Communication issued on Mar. 1, 2024 by the Russian Patent Office for Russian Patent Application No. 2023119136.

* cited by examiner

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 17

| SQUARE BLOCK | |
|---|---|
| (00)b | □ |
| (01)b | ⊞ |
| (10)b | ⊟ |
| (11)b | ⊡ |

| NON-SQUARE BLOCK | |
|---|---|
| (0)b | ▭  ▯ |
| (10)b | ▭▭  ▯▯ |
| (11)b | ▭▭▭  ▯▯▯ |

FIG. 18

| SQUARE BLOCK | |
|---|---|
| (00)b | □ |
| (10)b | ⊟ |
| (11)b | ⊞ |

| NON-SQUARE BLOCK | | |
|---|---|---|
| (0)b | ▭ | ▯ |
| (10)b | ⊟ | ⊟ |
| (11)b | ⊞ | ⊞ |

FIG. 22

| AMVR index | Motion Vector Resolution | Neighboring Block |
|---|---|---|
| 0 | 1/4-pel | A1 |
| 1 | 1/2-pel | B1 |
| 2 | 1-pel | B0 |
| 3 | 2-pel | A0 |
| 4 | 4-pel | B2 |

FIG. 28

```
If mvpAvailFlag is equal to 0, the following applies:                                                                                          — S2810
 - The derivation process for default motion vector is invoked with the luma location ( xCb, yCb ), the current luma coding block
   width nCbW, the current luma coding block height nCbH and the reference index of the current coding unit partition refIdxLX as
   inputs, and the output is assigned to the default motion vector predictor DefaultMvLX, with X being 0 or 1.
For the derivation of DefaultMvLX with X being 0 or 1, the following applies:                                                                  — S2820
 - The derivation process for neighbouring block motion vector candidate availability is invoked with the luma location
   ( xNbA₁, yNbA₁ ) as input, and the output is assigned to the coding block availability flag availableA₁.
 - The derivation process for neighbouring block motion vector candidate availability is invoked with the luma location
   ( xNbB₁, yNbB₁ ) as input, and the output is assigned to the coding block availability flag availableB₁.
 - Both components of DefaultMvLX are set equal to 0.                                                                                          — S2830
 - If availableA₁ is equal to TRUE and refIdxLX is equal to RefIdxLX[ xNbA₁ ][ yNbA₁ ], DefaultMvLX is set equal to                              — S2840
   MvLX[ xNbA₁ ][ yNbA₁ ].
 - Otherwise, if availableB₁ is equal to TRUE and refIdxLX is equal to RefIdxLX[ xNbB₁ ][ yNbB₁ ], DefaultMvLX is set equal to                   — S2850
   MvLX[ xNbB₁ ][ yNbB₁ ].
 - Otherwise, if availableA₁ is equal to TRUE and RefIdxLX[ xNbA₁ ][ yNbA₁ ] is not equal to −1, DefaultMvLX is set equal to                     — S2860
   MvLX[ xNbA₁ ][ yNbA₁ ].
 - Otherwise, if availableB₁ is equal to TRUE and RefIdxLX[ xNbB₁ ][ yNbB₁ ] is not equal to −1, DefaultMvLX is set equal to                     — S2870
   MvLX[ xNbB₁ ][ yNbB₁ ].
 - Otherwise, if sps_hmvp_flag is equal to 1 and NumHmvpCand ( number of entries in HmvpCandList ) is greater than 0, the                       — S2880
   DefaultMvLX is set equal to the DefaultMvLX of the history motion vector candidates derived with refIdxLX as input.
 - When refIdxLX is not equal to DefaultRefIdxLX, DefaultMvLX is derived as follows:                                                            — S2890
    - The POC distance (denoted as currPocDiffX) between current picture and reference picture list
      RefPicListX[DefaultRefIdxLX], is computed as follows:
          currPocDiffX = DiffPicOrderCnt( currPic, RefPicListX[ DefaultRefIdxLX ] )
    - The POC distance (denoted as targetPocDiffLX ) between current picture and the list X target reference picture of current
      picture is computed as follows:
          targetPocDiffLX = DiffPicOrderCnt( currPic, RefPicListX[ refIdxLX ] )
          distScaleFactorLX = ( targetPocDiffLX << 5 ) / currPocDiffLX
      DefaultMvLX is derived as a scaled version of the motion vector as follows:
          DefaultMvLX = Clip3( −32768, 32767, Sign( distScaleFactorLX * DefaultMvLX ) *
                ( ( Abs( distScaleFactorLX * DefaultMvLX ) + 16 ) >> 5 ) )
The following applies:                                                                                                                         — S2895
 mvpLX[ 0 ] = DefaultMvLX[ 0 ]
 mvpLX[ 1 ] = DefaultMvLX[ 1 ]
```

DEVICE AND METHOD FOR ENCODING MOTION VECTOR, AND DEVICE AND METHOD FOR DECODING MOTION VECTOR

CROSS-REFERENCE TO RELATED APPLICATIONS

This application is a bypass continuation application of International Application No. PCT/KR2021/001070, filed on Jan. 27, 2021, which claims priority to Korean Patent Application No. 10-2020-0044297, filed on Apr. 10, 2020, and Korean Patent Application No. 10-2021-0011031, filed on Jan. 26, 2021, in the Korean Intellectual Property Office, the disclosures of which are incorporated by reference herein in their entireties.

BACKGROUND

1. Field

The disclosure relates to the field of image encoding and decoding. More particularly, the disclosure relates to an apparatus and method for encoding and decoding a current motion vector by using its neighboring motion vector.

2. Description of Related Art

In image encoding and decoding, an image is split into blocks, and each block is prediction-encoded and prediction-decoded through inter prediction or intra prediction.

Inter prediction is a method of removing temporal redundancy between images to compress the images. A representative example of inter prediction is motion estimation coding. Motion estimation coding predicts blocks of a current picture by using at least one reference picture. A reference block that is most similar to a current block is searched for within a preset search range by using a preset evaluation function. The current block is predicted based on the reference block, and a prediction block generated as a result of prediction is subtracted from the current block to generate a residual block. The residual block is then encoded. To more accurately perform the prediction, interpolation is performed on the reference picture to generate pixels in a sub pel unit that is smaller than an integer pel unit, and inter prediction is performed based on the pixels in the sub pel unit.

In a codec, such as H.264 Advanced Video Coding (AVC) and High Efficiency Video Coding (HEVC), motion vectors of previously encoded blocks adjacent to a current block or blocks included in previously encoded images are used to predict a motion vector of the current block. Differential motion vectors, which are differences between motion vectors of the current block and the motion vectors of the previously encoded blocks, are signaled to a decoder side through a preset method.

SUMMARY

Provided is an apparatus and method for encoding a motion vector and an apparatus and method for decoding a motion vector, by which prediction accuracy of a motion vector of a current block is improved.

Provided is an apparatus and method for encoding a motion vector and an apparatus and method for decoding a motion vector, by which the size of a differential motion vector included in a bitstream is reduced.

In an apparatus and method for encoding a motion vector and an apparatus and method for decoding a motion vector, according to one or more embodiments, prediction accuracy of a motion vector of a current block may be improved.

In an apparatus and method for encoding a motion vector and an apparatus and method for decoding a motion vector, according to one or more embodiments, the size of a differential motion vector included in a bitstream may be reduced.

It should be noted that effects that can be achieved by the apparatus and method for encoding a motion vector and the apparatus and method for decoding a motion vector, according to an embodiment, are not limited to those described above, and other effects not mentioned will be apparent to one of ordinary skill in the art from the following descriptions.

Additional aspects will be set forth in part in the description which follows and, in part, will be apparent from the description, or may be learned by practice of the presented embodiments.

In accordance with an aspect of the disclosure, a method, performed by an image decoding apparatus, of decoding a motion vector includes obtaining information indicating a motion vector resolution of a current block from a bitstream; selecting a first neighboring block from among neighboring blocks adjacent to the current block, by using the obtained information indicating the motion vector resolution of the current block; based on the current block referring to a reference picture in a list 0, and the first neighboring block referring to the reference picture in the list 0, determining a prediction motion vector of the current block using a motion vector of the first neighboring block; based on the current block referring to the reference picture in the list 0 and the first neighboring block referring to a reference picture in a list 1, selecting a motion vector of a second neighboring block among the neighboring blocks as a basic motion vector, and determining the prediction motion vector of the current block using the determined basic motion vector; and determining a motion vector of the current block using the prediction motion vector of the current block.

The prediction motion vector of the current block may be obtained using the motion vector of the first neighboring block based on determining that the first neighboring block is available according to first availability information corresponding to the first neighboring block.

An availability of the first neighboring block may be determined according to at least one from among a determination about whether a tile including the first neighboring block is different from a tile including the current block, a determination about whether the first neighboring block is located outside a current picture, a determination about whether the first neighboring block has been intra-predicted, and a determination about whether the first neighboring block is reconstructed.

The motion vector resolution may be included in a plurality of motion vector resolutions, and the plurality of motion vector resolutions may correspond to neighboring blocks at different locations.

A location of the second neighboring block may be determined based on information indicating availabilities of left neighboring blocks and right neighboring blocks of the current block.

The prediction motion vector of the current block may be determined using the basic motion vector based on determining that the second neighboring block is available according to second availability information indicating corresponding to the second neighboring block, and that the second neighboring block refers to the reference picture in the list 0.

The prediction motion vector of the current block may be determined using the basic motion vector based on determining that the second neighboring block is not available according to the second availability information, or that the second neighboring block refers to the reference picture in the list 1.

In accordance with an aspect of the disclosure, an image decoding apparatus includes an obtainer configured to obtain information indicating a motion vector resolution of a current block from a bitstream; a motion vector prediction unit configured to: select a first neighboring block from among neighboring blocks adjacent to the current block, by using the obtained information indicating the motion vector resolution of the current block, based on the current block referring to a reference picture in a list 0, and the first neighboring block referring to the reference picture in the list 0, determining a prediction motion vector of the current block using a motion vector of the first neighboring block, and based on the current block referring to the reference picture in the list 0 and the first neighboring block referring to a reference picture in a list 1, select a motion vector of a second neighboring block among the neighboring blocks as a basic motion vector, and determine the prediction motion vector of the current block using the determined basic motion vector; and a motion vector reconstruction unit configured to determine a motion vector of the current block using the prediction motion vector of the current block.

In accordance with an aspect of the disclosure, a method, performed by an image encoding apparatus, of encoding a motion vector, includes determining a motion vector resolution of a current block; selecting a first neighboring block from among neighboring blocks adjacent to the current block, based on the motion vector resolution of the current block; based on the current block referring to a reference picture in a list 0 and the first neighboring block referring to the reference picture in the list 0, determining a prediction motion vector of the current block using a motion vector of the first neighboring block based on the current block referring to the reference picture in the list 0 and the first neighboring block referring to a reference picture in a list 1, selecting a motion vector of a second neighboring block among the neighboring blocks as a basic motion vector, and determining the prediction motion vector of the current block by using the determined basic motion vector; and generating a bitstream comprising information indicating the motion vector resolution of the current block, and a differential motion vector determined using the motion vector of the current block and the prediction motion vector of the current block.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 13 illustrates a process of determining a depth of a coding unit as a shape and size of the coding unit change, when the coding unit is recursively split such that a plurality of coding units are determined, according to an embodiment;

FIG. 17 illustrates various shapes of coding units that can be determined based on split shape mode information that is expressed with a binary code, according to an embodiment;

FIG. 18 illustrates other shapes of coding units that can be determined based on split shape mode information that is expressed with a binary code, according to an embodiment;

FIG. 22 is a table showing a matching relationship between indexes of motion vector resolutions, the motion vector resolutions, and locations of neighboring blocks, according to an embodiment;

FIG. 28 is a view for explaining a process of obtaining a prediction motion vector, according to an embodiment.

DETAILED DESCRIPTION

Figure 1:
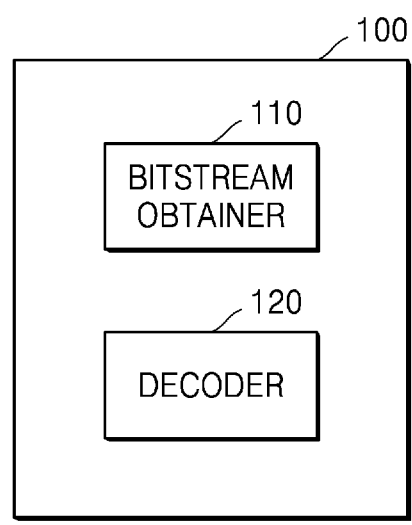
FIG. 1 is a block diagram of an image decoding apparatus according to an embodiment.

A method of decoding a motion vector, according to an embodiment, includes selecting a first neighboring block from among neighboring blocks adjacent to a current block, according to information obtained from a bitstream; when the first neighboring block is identified as being available by using information indicating the availability of the first neighboring block and a motion vector of the first neighboring block in the same prediction direction as a prediction direction of the current block does not exist, obtaining a prediction motion vector of the current block from a motion vector of a second neighboring block at a pre-determined location, the second neighboring block being adjacent to the current block; and obtaining a motion vector of the current block by combining the prediction motion vector of the current block with a differential motion vector.

When a reference picture index of the second neighboring block in the same prediction direction as the prediction direction of the current block is −1, the motion vector of the first neighboring block in the same prediction direction as the prediction direction of the current block may not exist.

The availability of the first neighboring block may be determined according to at least one of whether a tile including the first neighboring block is different from a tile including the current block, whether the first neighboring block is located outside the current picture, whether the first neighboring block has been intra-predicted, and whether the first neighboring block is reconstructed.

The obtaining of the motion vector of the current block may include, when the first neighboring block is identified as being available by using the information indicating the availability of the first neighboring block, and the motion vector of the first neighboring block in the same prediction direction as the prediction direction of the current block exists, obtaining the prediction motion vector of the current block from the motion vector of the first neighboring block.

The information obtained from the bitstream may include information indicating a motion vector resolution of the current block from among a plurality of motion vector resolutions, and the plurality of the motion vector resolutions may be mapped with neighboring blocks at different locations.

The location of the second neighboring block may vary according to information indicating the availabilities of left and right neighboring blocks of the current block.

The obtaining of the prediction motion vector of the current block may include, when the second neighboring block is identified as being available by using information indicating the availability of the second neighboring block and a reference picture index of the second neighboring block in the same prediction direction as the prediction direction of the current block is identical to a reference picture index of the current block or the motion vector of the second neighboring block in the same prediction direction as the prediction direction of the current block exists, obtaining the prediction motion vector of the current block from the motion vector of the second neighboring block.

The obtaining of the prediction motion vector of the current block may include, when the second neighboring block is identified as not being available by using the information indicating the availability of the second neighboring block or the motion vector of the second neighboring block in the same prediction direction as the prediction direction of the current block does not exist, obtaining the prediction motion vector of the current block from a motion vector of a block decoded before the current block.

The obtaining of the prediction motion vector of the current block may include, when the first neighboring block is identified as not being available, obtaining the prediction motion vector of the current block from the motion vector of the second neighboring block.

An image decoding apparatus according to an embodiment includes a motion vector prediction unit configured to select a first neighboring block from among neighboring blocks adjacent to a current block, according to information obtained from a bitstream, and, when the first neighboring block is identified as being available by using information indicating the availability of the first neighboring block and a motion vector of the first neighboring block in the same prediction direction as a prediction direction of the current block does not exist, obtain a prediction motion vector of the current block from a motion vector of a second neighboring block at a pre-determined location, the second neighboring block being adjacent to the current block; and a motion vector reconstruction unit configured to obtain a motion vector of the current block by combining the prediction motion vector of the current block with a differential motion vector.

A method of encoding a motion vector, according to an embodiment, includes, when a first neighboring block selected from among neighboring blocks adjacent to a current block is identified as being available and a motion vector of the first neighboring block in the same prediction direction as a prediction direction of the current block does not exist, obtaining a prediction motion vector of the current block from a motion vector of a second neighboring block at a pre-determined location, the second neighboring block being adjacent to the current block; and generating a bitstream including a differential motion vector between the motion vector of a current block and the prediction motion vector of the current block, and information for indicating the first neighboring block.

As the disclosure allows for various changes and numerous embodiments, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

In the description of embodiments of the disclosure, certain detailed explanations of the related art are omitted when it is deemed that they may unnecessarily obscure the essence of the disclosure. While such terms as "first," "second," etc., may be used to describe various components, such components must not be limited to the above terms. The above terms are used only to distinguish one component from another.

When an element (e.g., a first element) is "coupled to" or "connected to" another element (e.g., a second element), the first element may be directly coupled to or connected to the second element, or, unless otherwise described, a third element may exist therebetween.

Regarding a component represented as a "portion (unit)" or a "module" used herein, two or more components may be combined into one component or one component may be divided into two or more components according to subdivided functions. In addition, each component described hereinafter may additionally perform some or all of functions performed by another component, in addition to main functions of itself, and some of the main functions of each component may be performed entirely by another component.

Also, an 'image' or a 'picture' used herein may denote a still image of video or a moving picture (video).

Also, a 'sample' or 'signal' used herein means, as data assigned to a sampling location of an image, data to be processed. For example, pixel values on a spatial-domain image and transform coefficients on a transform domain may be samples. A unit including such one or more samples may be defined as a block.

Hereinafter, an image encoding method and apparatus and an image decoding method and apparatus based on coding units and transformation units having a tree structure according to an embodiment will be described with reference to FIGS. 1 through 19.

FIG. 1 is a block diagram of an image decoding apparatus 100 according to an embodiment.

The image decoding apparatus 100 may include a bitstream obtainer 110 and a decoder 120. The bitstream obtainer 110 and the decoder 120 may include at least one processor. The bitstream obtainer 110 and the decoder 120 may include a memory storing instructions that are to be executed by the at least one processor.

The bitstream obtainer 110 may receive a bitstream. The bitstream may include information resulting from image encoding by an image encoding apparatus 200 which will be described in more detail below. The bitstream may be transmitted from the image encoding apparatus 200. The image decoding apparatus 100 may be connected to the image encoding apparatus 200 in a wired or wireless manner, and the bitstream obtainer 110 may receive a bitstream in a wired or wireless manner. The bitstream obtainer 110 may receive a bitstream from a storage medium, such as optical media, a hard disk, etc. The decoder 120 may reconstruct an image, based on information obtained from the received bitstream. The decoder 120 may obtain a syntax element for reconstructing an image from the bitstream. The decoder 120 may reconstruct the image, based on the syntax element.

Describing an example of an operation of the image decoding apparatus 100 in detail, the bitstream obtainer 110 may receive a bitstream.

The image decoding apparatus 100 may perform an operation of obtaining a bin string corresponding to a split shape mode of a coding unit from the bitstream. The image decoding apparatus 100 may perform an operation of determining a split rule of a coding unit. The image decoding apparatus 100 may perform an operation of splitting a coding unit into a plurality of coding units, based on at least one of the bin string corresponding to the split shape mode and the split rule. The image decoding apparatus 100 may determine a first range which is an allowable size range of a coding unit, according to a ratio of a height to a width of the coding unit, in order to determine the split rule. The image decoding apparatus 100 may determine a second range which is an allowable size range of a coding unit, according to a split shape mode of the coding unit, in order to determine the split rule.

Hereinafter, an example of splitting of a coding unit will be described in detail according to an embodiment of the disclosure.

First, one picture may be split into one or more slices or one or more tiles. One slice or one tile may be a sequence of one or more largest coding units, which may be or for example coding tree units (CTUs). According to an implementation example, one slice includes one or more tiles, or one slice may include one or more largest coding units. A slice including one tile or a plurality of tiles may be determined within a picture.

There is a largest coding block, which may be for example a coding tree block (CTB), conceptually compared to a largest coding unit (or CTU). The largest coding block (or CTB) denotes an N×N block including N×N samples (where N is an integer). Each color component may be split into one or more largest coding blocks.

When a picture has three sample arrays (sample arrays for Y, Cr, and Cb components), a largest coding unit (or CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (or CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. In other words, a coding unit, or a largest coding unit, refers to a data structure including a coding block, or a largest coding block, including a corresponding sample and a syntax structure corresponding to the coding block, or the largest coding block. However, because it is understood by one of ordinary skill in the art that a coding unit, a largest coding unit, a coding block, or a largest coding block refers to a block of a preset size including a preset number of samples, a largest coding block and a largest coding unit, or a coding block and a coding unit are mentioned in the following specification without being distinguished unless otherwise described.

An image may be split into largest coding units (or CTUs). A size of each largest coding unit may be determined based on information obtained from a bitstream. A shape of each largest coding unit may be a square shape of the same size. However, embodiments of the disclosure are not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

A largest coding unit may be hierarchically split into coding units, based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, predetermined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of the coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. Examples of the splitting of the coding unit will be described in detail with reference to FIGS. 3 to 16.

Also, one or more prediction blocks for prediction may be determined from a coding unit. The prediction block may be the same as or smaller than the coding unit. Also, one or more transform blocks for transformation may be determined from a coding unit. The transform block may be equal to or smaller than the coding unit.

The shapes and sizes of the transform block and prediction block may be unrelated to each other.

In another embodiment, prediction may be performed by using a coding unit as a predictor. Also, transformation may be performed by using a coding unit as a transform block.

Examples of the splitting of the coding unit will be described in detail with reference to FIGS. 3 to 16. A current block and a neighboring block of the disclosure may indicate one of the largest coding unit, the coding unit, the prediction block, and the transform block. Also, the current block of the current coding unit is a block that is currently being decoded or encoded or a block that is currently being split. The neighboring block may be a block reconstructed before the current block. The neighboring block may be adjacent to the current block spatially or temporally. The neighboring block may be located at one of the lower left, left, upper left, top, upper right, right, lower right of the current block.

Figure 3:
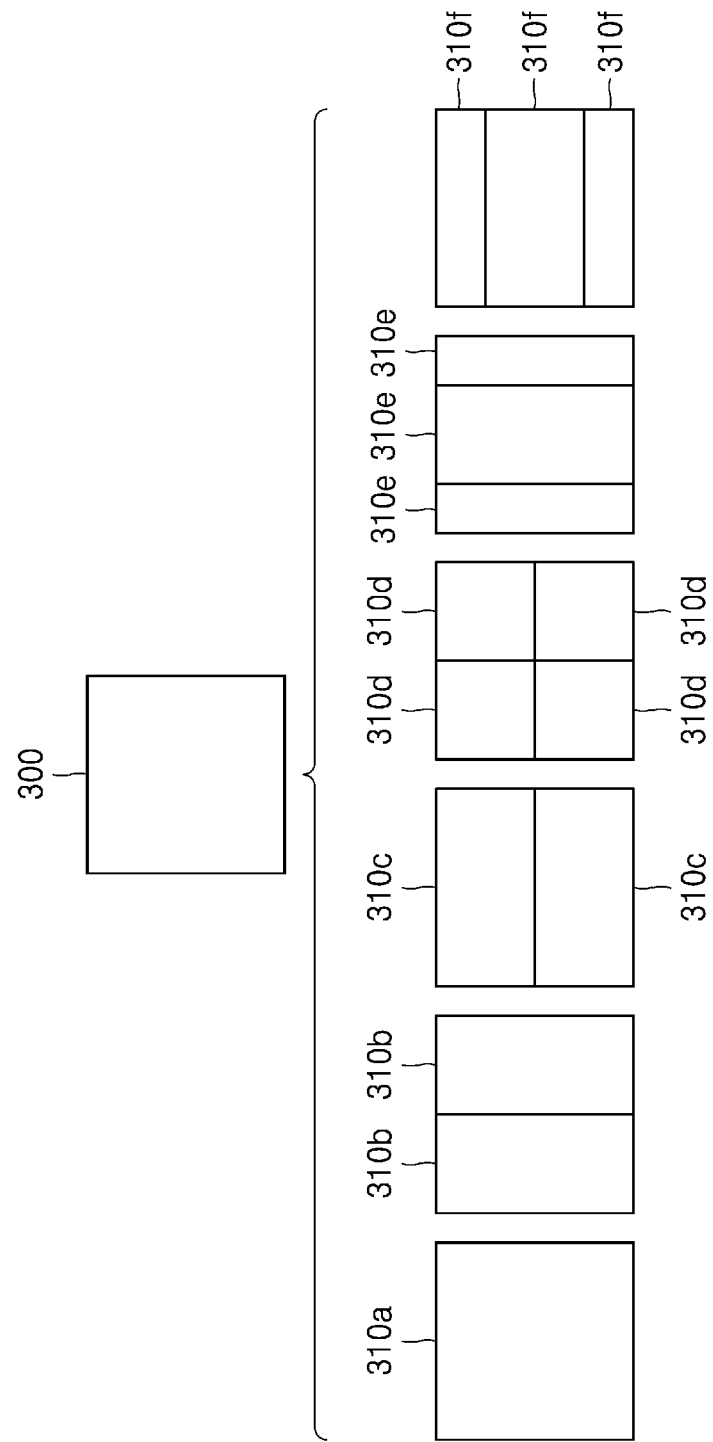
FIG. 3 illustrates a process of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or size of a coding unit.

The shape of the coding unit may include a square and a non-square. When the lengths of the width and the height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, embodiments are not limited thereto, and the image decoding apparatus 100 and the image encoding apparatus 200 may determine pre-agreed split shape mode information, based on the block shape information. The image decoding apparatus 100 may determine the pre-agreed split shape mode information with respect to a largest coding unit or a minimum coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting", or no split. In detail, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310a having the same size as the current coding unit 300, based on the split shape mode information indicating not to perform splitting, or may determine coding units 310b, 310c, 310d, 310e, or 310f split based on the split shape mode information indicating a preset splitting method. In embodiments, coding units 310b, 310c, 310d, 310e, or 310f may be determined or obtained by splitting current coding unit 300 based on the indicated splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary splitting in a vertical direction. The image decoding apparatus 100 may determine three coding units 310f obtained by splitting the current coding unit 300 in a horizontal direction, based on the split shape mode information indicating to perform ternary splitting in a horizontal direction. However, splitting methods of the square coding unit are not limited to the above-described methods, and the split shape mode information may indicate various methods. Examples of preset splitting methods of splitting the square coding unit will be described in detail below in relation to various embodiments.

Figure 4:
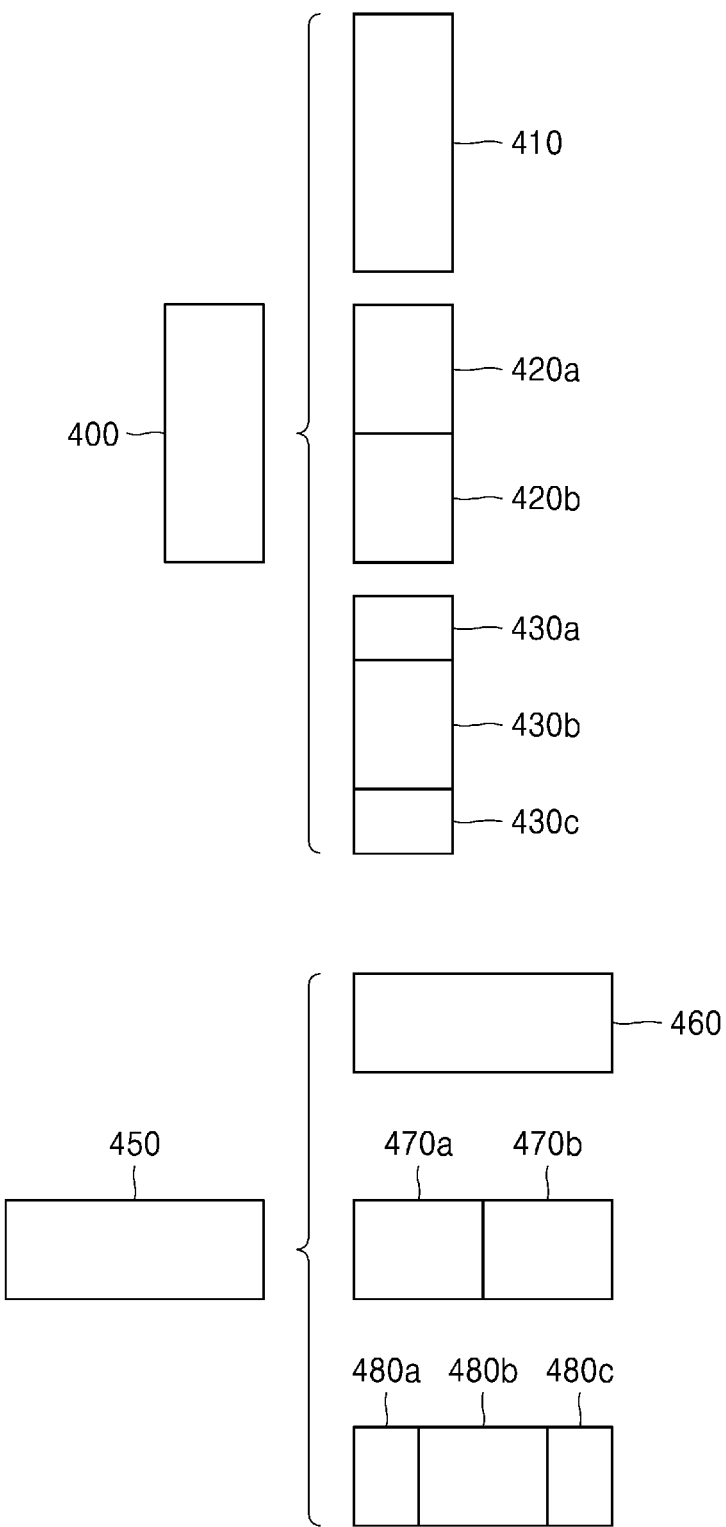
FIG. 4 illustrates a process of determining at least one coding unit by splitting a non-square coding unit, according to an embodiment.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a preset splitting method, based on split shape mode information. Referring to FIG. 4, when the block shape information of a current coding unit 400 or 450 indicates a non-square shape, the image decoding apparatus 100 may determine a coding unit 410 having the same size as the current coding unit 400 or coding unit 460 having the same size as the current coding unit 450, based on the split shape mode information indicating not to perform splitting, or may determine coding units 420a and 420b, 430a to 430c, 470a and 470b, or 480a to 480c split based on the split shape mode information indicating a preset splitting method. In embodiments, coding units 420a and 420b or 430a to 430c may be determined or obtained by splitting current coding unit 400 based on the indicated splitting method, and coding unit 470a and 470b, or 480a to 480c may be determined or obtained by splitting current coding unit 450 based on the indicated splitting method. In embodiments, preset splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b included in the current coding unit 400, or 470a and 470b included in the current coding unit 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting the current coding unit 400 or 450 in a direction of splitting a long side of the current coding unit 400 or 450, in consideration of the shape of the current coding unit 400 or 450.

According to an embodiment, when the split shape mode information indicates to split a coding unit into an odd number of blocks, for example in a ternary split, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 into three coding units 430a, 430b, and 430c, or split the current coding unit 450 into three coding units 480a, 480b, and 480c.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into an odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a, 430b, and 430c by splitting the current coding unit 400 in the horizontal direction. Also, when the current coding unit 450 is in the horizontal direction, the image decoding apparatus 100 may determine the coding units 480a, 480b, and 480c by splitting the current coding unit 450 in the vertical direction.

According to an embodiment, the image decoding apparatus 100 may determine an odd number of coding units included in the current coding unit 400 or 450, and not all the determined coding units may have the same size. For example, a preset coding unit 430b from among the determined odd number of coding units 430a, 430b, and 430c may have a size different from the size of the other coding units 430a and 430c, or a preset coding unit 480b from among the determined odd number of coding units 480a, 480b, and 480c may have a size different from the size of the other coding units 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and moreover, may put a preset restriction on at least one coding unit from among the odd number of coding units generated by splitting the current coding unit 400 or 450. Referring to FIG. 4, the image decoding apparatus 100 may set a decoding process regarding the coding unit 430b located at the center among the three coding units 430a, 430b, and 430c, generated as the current coding unit 400 is split, to be different from that of the other coding units 430a and 430c, or may set a decoding process regarding the coding unit 480b located at the center among the three coding units 480a, 480b, and 480c generated as the current coding unit 450 is split to be different from that of the other coding units 480a and 480c. For example, the image decoding apparatus 100 may restrict the coding unit 430b or 480b at the center location to be no longer split or to be split only a preset number of times, unlike the other coding units 430a and 430c, or 480a and 480c.

Figure 5:
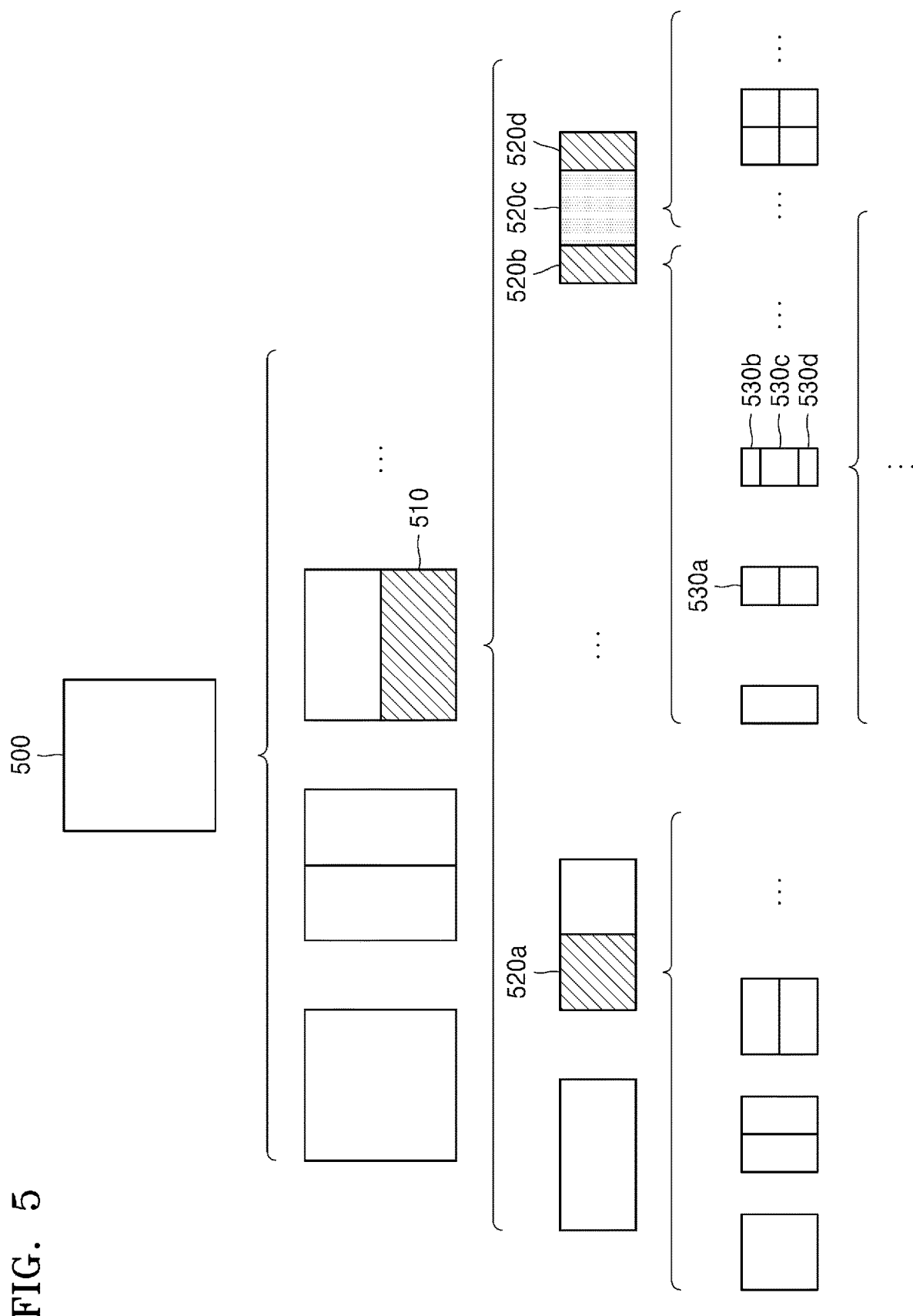
FIG. 5 illustrates a process of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit.

For example, a second coding unit may be determined by splitting a first coding unit, and a third coding unit may be determined by splitting the second coding unit. It will be understood that the relation of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520a, 520b, 520c, and 520d based on the split shape mode information, or may not split the non-square second coding unit 510. The image decoding apparatus 100 may obtain the split shape mode information, and may obtain a plurality of various-shaped second coding units (e.g., second coding unit 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units (e.g., 520a, or 520b, 520c, and 520d) based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a preset coding unit (e.g., a coding unit located at a center location, or a square coding unit) from among an odd number of third coding units 520b, 520c, and 520d determined by splitting the non-square second coding unit 510 may be recursively split. According to an embodiment, the non-square third coding unit 520b from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be re-split into a plurality of coding units. For example, the non-square fourth coding unit 530b or 530d may be re-split into an odd number of coding units. A method that may be used to recursively split a coding unit will be described below in relation to various embodiments.

According to an embodiment, the image decoding apparatus 100 may split each of the third coding units 520a, or 520b, 520c, and 520d into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a preset restriction on a preset third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a preset splitting method (e.g., split into only four coding units or split by using a splitting method of the second coding unit 510), or to be split only a preset number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain the split shape mode information, which is used to split a current coding unit, from a preset location in the current coding unit.

Figure 6:
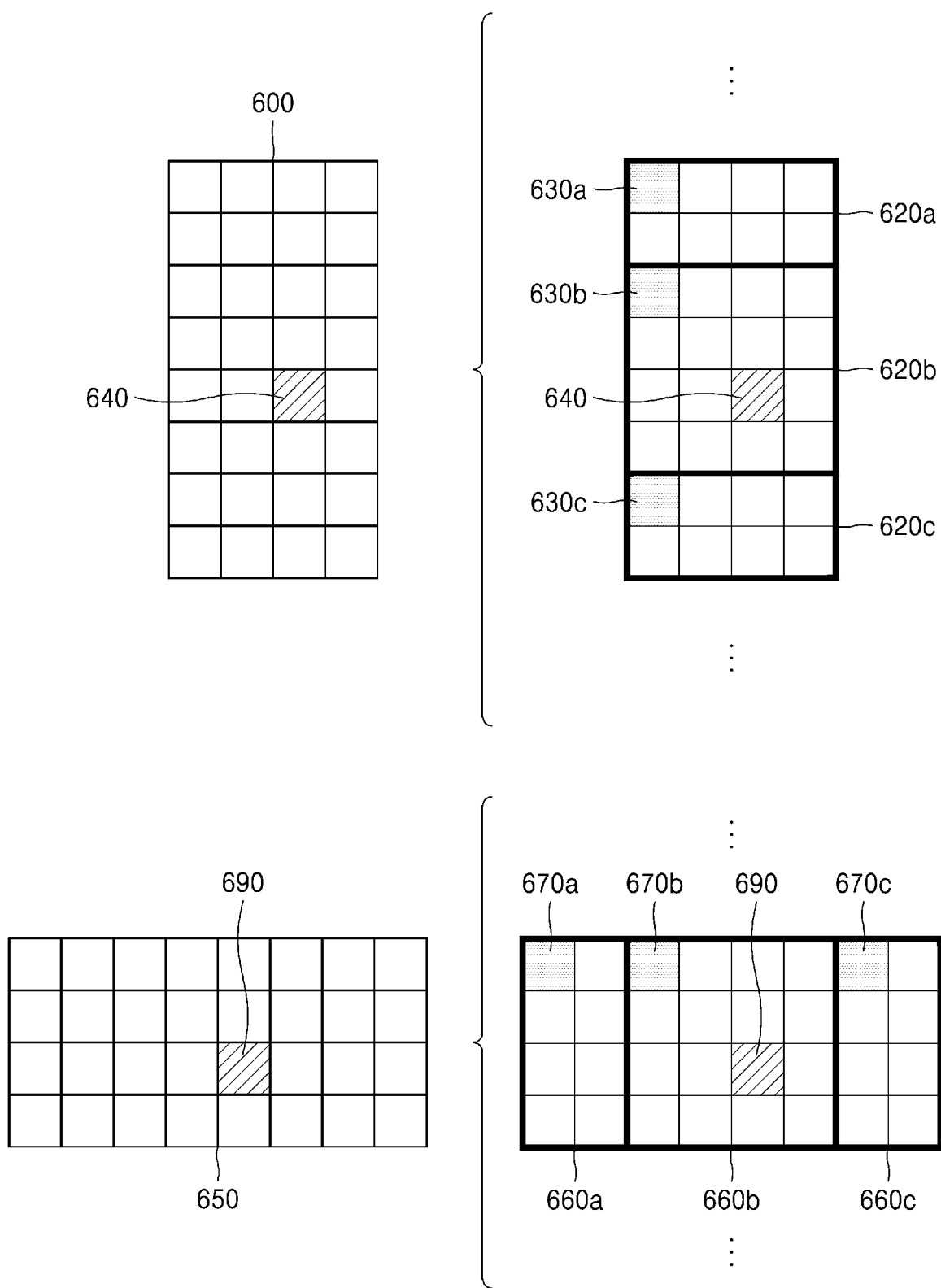
FIG. 6 illustrates a method of determining a preset coding unit from among an odd number of coding units, according to an embodiment.

FIG. 6 illustrates a method, performed by the image decoding apparatus 100, of determining a preset coding unit from among an odd number of coding units, according to an embodiment.

Referring to FIG. 6, split shape mode information of a current coding unit 600 or 650 may be obtained from a sample of a preset location (e.g., a sample 640 or 690 of a center location) from among a plurality of samples included in the current coding unit 600 or 650. However, the preset location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, lower right locations, or the like). The image decoding apparatus 100 may obtain the split shape mode information from the preset location and may determine to split or not to split the current coding unit into various-shaped and various-sized coding units.

According to an embodiment, when the current coding unit is split into a preset number of coding units, the image decoding apparatus 100 may select one of the coding units. Various methods may be used to select one of a plurality of coding units, examples of which will be described below in relation to various embodiments.

According to an embodiment, the image decoding apparatus 100 may split the current coding unit into a plurality of coding units, and may determine a coding unit at a preset location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of preset samples included in the coding units 620a, 620b, and 620c. In detail, the image decoding apparatus 100 may determine the coding unit 620b at the center location by determining the locations of the coding units 620*a*, 620*b*, and 620*c* based on information indicating locations of upper-left samples 630*a*, 630*b*, and 630*c* of the coding units 620*a*, 620*b*, and 620*c*.

According to an embodiment, the information indicating the locations of the upper-left samples 630*a*, 630*b*, and 630*c*, which are included in the coding units 620*a*, 620*b*, and 620*c*, respectively, may include information about locations or coordinates of the coding units 620*a*, 620*b*, and 620*c* in a picture. According to an embodiment, the information indicating the locations of the upper-left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the image decoding apparatus 100 may determine the coding unit 620*b* at the center location by directly using the information about the locations or coordinates of the coding units 620*a*, 620*b*, and 620*c* in the picture, or by using the information about the widths or heights of the coding units, which correspond to the difference values between the coordinates.

According to an embodiment, information indicating the location of the upper-left sample 630*a* of the upper coding unit 620*a* may include coordinates (xa, ya), information indicating the location of the upper-left sample 630*b* of the middle coding unit 620*b* may include coordinates (xb, yb), and information indicating the location of the upper-left sample 630*c* of the lower coding unit 620*c* may include coordinates (xc, yc). The image decoding apparatus 100 may determine the middle coding unit 620*b* by using the coordinates of the upper-left samples 630*a*, 630*b*, and 630*c* which are included in the coding units 620*a*, 620*b*, and 620*c*, respectively. For example, when the coordinates of the upper-left samples 630*a*, 630*b*, and 630*c* are sorted in an ascending or descending order, the coding unit 620*b* including the coordinates (xb, yb) of the sample 630*b* at a center location may be determined as a coding unit at a center location from among the coding units 620*a*, 620*b*, and 620*c* determined by splitting the current coding unit 600. However, the coordinates indicating the locations of the upper-left samples 630*a*, 630*b*, and 630*c* may include coordinates indicating absolute locations in the picture, or may use coordinates (dxb, dyb) indicating a relative location of the upper-left sample 630*b* of the middle coding unit 620*b* and coordinates (dxc, dyc) indicating a relative location of the upper-left sample 630*c* of the lower coding unit 620*c* with reference to the location of the upper-left sample 630*a* of the upper coding unit 620*a*. A method of determining a coding unit at a preset location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620*a*, 620*b*, and 620*c*, and may select one of the coding units 620*a*, 620*b*, and 620*c* based on a preset criterion. For example, the image decoding apparatus 100 may select the coding unit 620*b*, which has a size different from that of the others, from among the coding units 620*a*, 620*b*, and 620*c*.

According to an embodiment, the image decoding apparatus 100 may determine the width or height of each of the coding units 620*a*, 620*b*, and 620*c* by using the coordinates (xa, ya) that is the information indicating the location of the upper-left sample 630*a* of the upper coding unit 620*a*, the coordinates (xb, yb) that is the information indicating the location of the upper-left sample 630*b* of the middle coding unit 620*b*, and the coordinates (xc, yc) that are the information indicating the location of the upper-left sample 630*c* of the lower coding unit 620*c*. The image decoding apparatus 100 may determine the respective sizes of the coding units 620*a*, 620*b*, and 620*c* by using the coordinates (xa, ya), (xb, yb), and (xc, yc) indicating the locations of the coding units 620*a*, 620*b*, and 620*c*. According to an embodiment, the image decoding apparatus 100 may determine the width of the upper coding unit 620*a* to be the width of the current coding unit 600. The image decoding apparatus 100 may determine the height of the upper coding unit 620*a* to be yb−ya. According to an embodiment, the image decoding apparatus 100 may determine the width of the middle coding unit 620*b* to be the width of the current coding unit 600. The image decoding apparatus 100 may determine the height of the middle coding unit 620*b* to be yc−yb. According to an embodiment, the image decoding apparatus 100 may determine the width or height of the lower coding unit 620*c* by using the width or height of the current coding unit 600 or the widths or heights of the upper coding unit 620*a* and middle coding unit 620*b*. The image decoding apparatus 100 may determine a coding unit, which has a size different from that of the other coding units, based on the determined widths and heights of the coding units 620*a*, 620*b*, and 620*c*. Referring to FIG. 6, the image decoding apparatus 100 may determine the middle coding unit 620*b*, which has a size different from the size of the upper coding unit 620*a* and lower coding unit 620*c*, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

The image decoding apparatus 100 may determine the width or height of each of the coding units 660*a*, 660*b*, and 660*c* by using the coordinates (xd, yd) that are information indicating the location of an upper-left sample 670*a* of the left coding unit 660*a*, the coordinates (xe, ye) that are information indicating the location of an upper-left sample 670*b* of the middle coding unit 660*b*, and the coordinates (xf, yf) that are information indicating a location of the upper-left sample 670*c* of the right coding unit 660*c*. The image decoding apparatus 100 may determine the respective sizes of the coding units 660*a*, 660*b*, and 660*c* by using the coordinates (xd, yd), (xe, ye), and (xf, yf) indicating the locations of the coding units 660*a*, 660*b*, and 660*c*.

According to an embodiment, the image decoding apparatus 100 may determine the width of the left coding unit 660*a* to be xe−xd. The image decoding apparatus 100 may determine the height of the left coding unit 660*a* to be the height of the current coding unit 650. According to an embodiment, the image decoding apparatus 100 may determine the width of the middle coding unit 660*b* to be xf−xe. The image decoding apparatus 100 may determine the height of the middle coding unit 660*b* to be the height of the current coding unit 650. According to an embodiment, the image decoding apparatus 100 may determine the width or height of the right coding unit 660*c* by using the width or height of the current coding unit 650 or the widths or heights of the left coding unit 660a and middle coding unit 660b. The image decoding apparatus 100 may determine a coding unit, which has a size different from that of the other coding units, based on the determined widths and heights of the coding units 660a, 660b, and 660c. Referring to FIG. 6, the image decoding apparatus 100 may determine the middle coding unit 660b, which has a size different from the sizes of the left coding unit 660a and right coding unit 660c, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a preset location from among an odd number of coding units determined by splitting the current coding unit, by considering the shape of the current coding unit. For example, when the current coding unit has a non-square shape, a width of which is longer than a height, the image decoding apparatus 100 may determine the coding unit at the preset location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the preset location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the preset location from among the even number of coding units. The image decoding apparatus 100 may determine an even number of coding units by splitting (binary splitting) the current coding unit, and may determine the coding unit at the preset location by using the information about the locations of the even number of coding units. An operation related thereto may correspond to the operation of determining a coding unit at a preset location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, preset information about a coding unit at a preset location may be used in a splitting operation to determine the coding unit at the preset location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, preset information for identifying the coding unit at the preset location may be obtained from a preset sample included in a coding unit to be determined. Referring to FIG. 6, the image decoding apparatus 100 may use the split shape mode information, which is obtained from a sample at a preset location in the current coding unit 600 (e.g., a sample at a center location of the current coding unit 600) to determine a coding unit at a preset location from among the plurality of coding units 620a, 620b, and 620c determined by splitting the current coding unit 600 (e.g., a coding unit at a center location from among a plurality of split coding units). That is, the image decoding apparatus 100 may determine the sample at the preset location by considering a block shape of the current coding unit 600, may determine the coding unit 620b including a sample, from which preset information (e.g., the split shape mode information) can be obtained, from among the plurality of coding units 620a, 620b, and 620c determined by splitting the current coding unit 600, and may put a preset restriction on the coding unit 620b. Referring to FIG. 6, according to an embodiment, the image decoding apparatus 100 may determine the sample 640 at the center location of the current coding unit 600 as the sample from which the preset information may be obtained, and may put a preset restriction on the coding unit 620b including the sample 640, in a decoding operation. However, the location of the sample from which the preset information can be obtained is not limited to the above-described location, and may include arbitrary locations of samples included in the coding unit 620b to be determined for a restriction.

According to an embodiment, the location of the sample from which the preset information may be obtained may be determined based on the shape of the current coding unit 600. According to an embodiment, the block shape information may indicate whether the current coding unit has a square or non-square shape, and the location of the sample from which the preset information may be obtained may be determined based on the shape. For example, the image decoding apparatus 100 may determine a sample located on a boundary for splitting at least one of a width and height of the current coding unit in half, as the sample from which the preset information can be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the preset information can be obtained.

According to an embodiment, when the current coding unit is split into a plurality of coding units, the image decoding apparatus 100 may use the split shape mode information to determine a coding unit at a preset location from among the plurality of coding units. According to an embodiment, the image decoding apparatus 100 may obtain the split shape mode information from a sample at a preset location in a coding unit, and may split the plurality of coding units, which are generated by splitting the current coding unit, by using the split shape mode information, which is obtained from the sample of the preset location in each of the plurality of coding units. That is, a coding unit may be recursively split based on the split shape mode information, which is obtained from the sample at the preset location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a preset block (e.g., the current coding unit).

Figure 7:
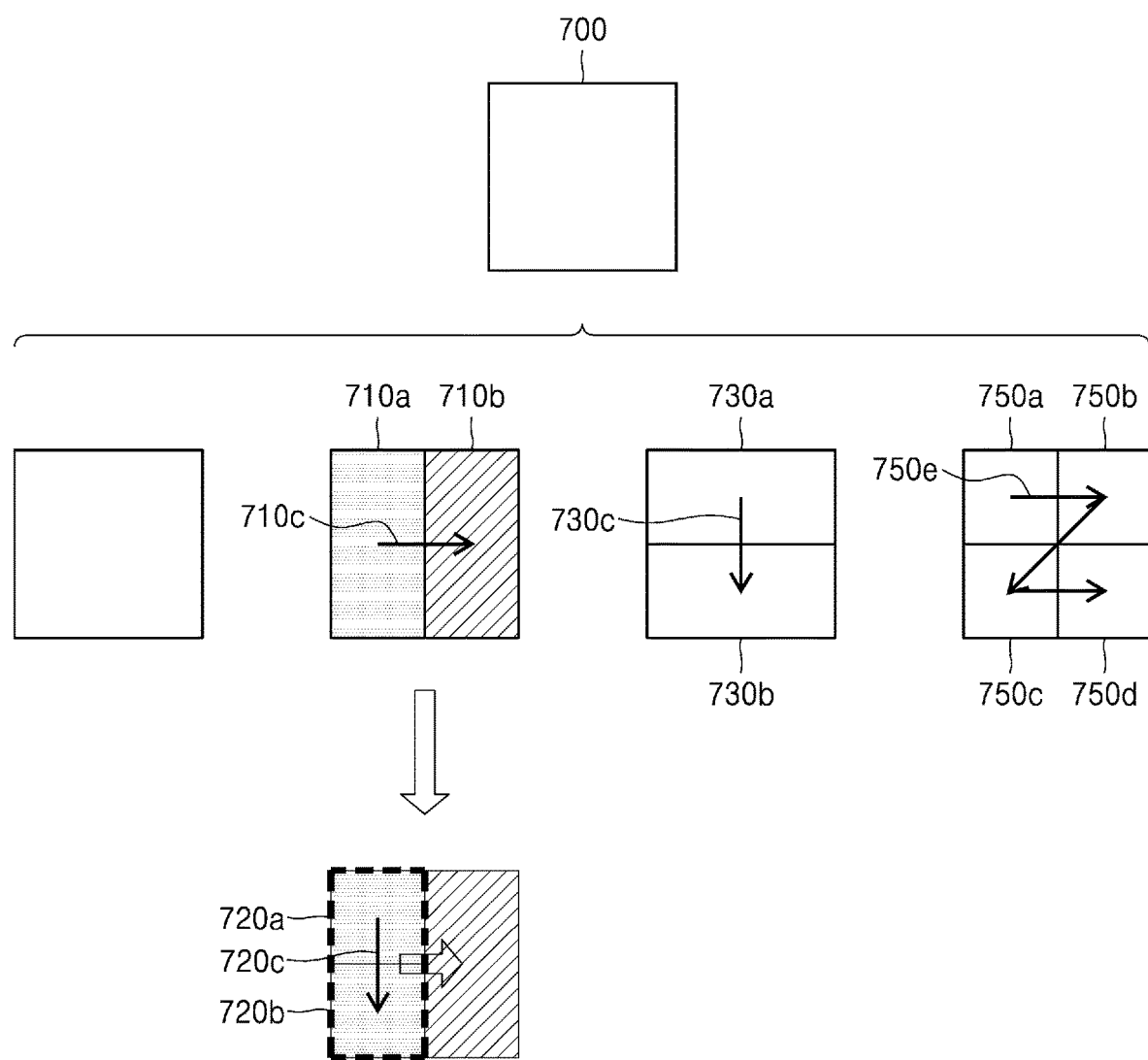
FIG. 7 illustrates an order of processing a plurality of coding units when determining the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a, 750b, 750c, and 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine the second coding units 750a, 750b, 750c, and 750d, which are determined by splitting the first coding unit 700 in vertical and horizontal directions, according to a preset order by which coding units in a row are processed and then coding units in a next row are processed (e.g., a raster scan order or Z-scan order 750e).

According to an embodiment, the image decoding apparatus 100 may recursively split coding units. Referring to FIG. 7, the image decoding apparatus 100 may determine the plurality of coding units 710a and 710b, 730a and 730b, or 750a, 750b, 750c, and 750d by splitting the first coding unit 700, and may recursively split each of the determined plurality of coding units 710a, 710b, 730a, 730b, 750a, 750b, 750c, and 750d. A splitting method of the plurality of coding units 710a and 710b, 730a and 730b, or 750a, 750b, 750c, and 750d may correspond to a splitting method of the first coding unit 700. Accordingly, each of the plurality of coding units 710a and 710b, 730a and 730b, or 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a preset order.

Figure 8:
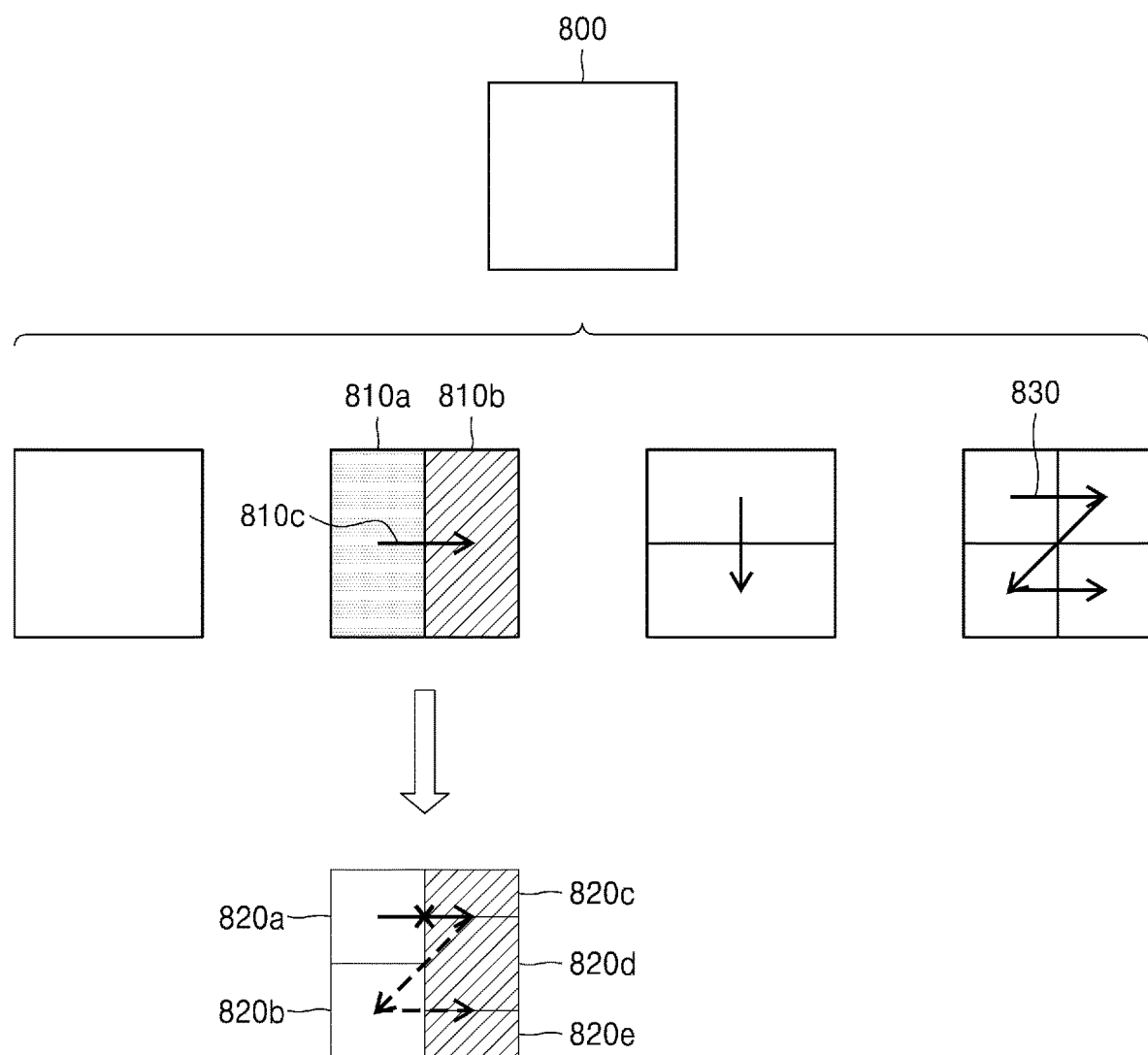
FIG. 8 illustrates a process of determining that a current coding unit is to be split into an odd number of coding units, when the coding units are not processable in a preset order, according to an embodiment.

FIG. 8 illustrates a process, performed by the image decoding apparatus 100, of determining that a current coding unit is to be split into an odd number of coding units, when the coding units are not processable in a preset order, according to an embodiment.

According to an embodiment, the image decoding apparatus 100 may determine that the current coding unit is to be split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c, 820d, and 820e.

According to an embodiment, the image decoding apparatus 100 may determine whether any coding unit is split into an odd number of coding units, by determining whether the third coding units 820a and 820b, and 820c, 820d, and 820e are processable in a preset order. Referring to FIG. 8, the image decoding apparatus 100 may determine the third coding units 820a and 820b, and 820c, 820d, and 820e by recursively splitting the first coding unit 800. The image decoding apparatus 100 may determine whether any of the first coding unit 800, the second coding units 810a and 810b, or the third coding units 820a and 820b, and 820c, 820d, and 820e are split into an odd number of coding units, based on at least one of the block shape information and the split shape mode information. For example, a coding unit located in the right from among the second coding units 810a and 810b may be split into an odd number of third coding units

820*c*, 820*d*, and 820*e*. A processing order of a plurality of coding units included in the first coding unit 800 may be a preset order (e.g., a Z-scan order 830), and the image decoding apparatus 100 may determine whether the third coding units 820*c*, 820*d*, and 820*e*, which are determined by splitting the right second coding unit 810*b* into an odd number of coding units, satisfy a condition for processing in the preset order.

According to an embodiment, the image decoding apparatus 100 may determine whether the third coding units 820*a* and 820*b*, and 820*c*, 820*d*, and 820*e* included in the first coding unit 800 satisfy the condition for processing in the preset order, and the condition relates to whether at least one of a width and height of the second coding units 810*a* and 810*b* is to be split in half along a boundary of the third coding units 820*a* and 820*b*, and 820*c*, 820*d*, and 820*e*. For example, the third coding units 820*a* and 820*b* determined when the height of the left second coding unit 810*a* of the non-square shape is split in half may satisfy the condition. It may be determined that the third coding units 820*c*, 820*d*, and 820*e* do not satisfy the condition because the boundaries of the third coding units 820*c*, 820*d*, and 820*e* determined when the right second coding unit 810*b* is split into three coding units are unable to split the width or height of the right second coding unit 810*b* in half. When the condition is not satisfied as described above, the image decoding apparatus 100 may determine disconnection of a scan order, and may determine that the right second coding unit 810*b* is to be split into an odd number of coding units, based on a result of the determination. According to an embodiment, when a coding unit is split into an odd number of coding units, the image decoding apparatus 100 may put a preset restriction on a coding unit at a preset location from among the split coding units. The restriction or the preset location has been described above in relation to various embodiments, and thus detailed descriptions thereof will not be provided herein.

Figure 9:
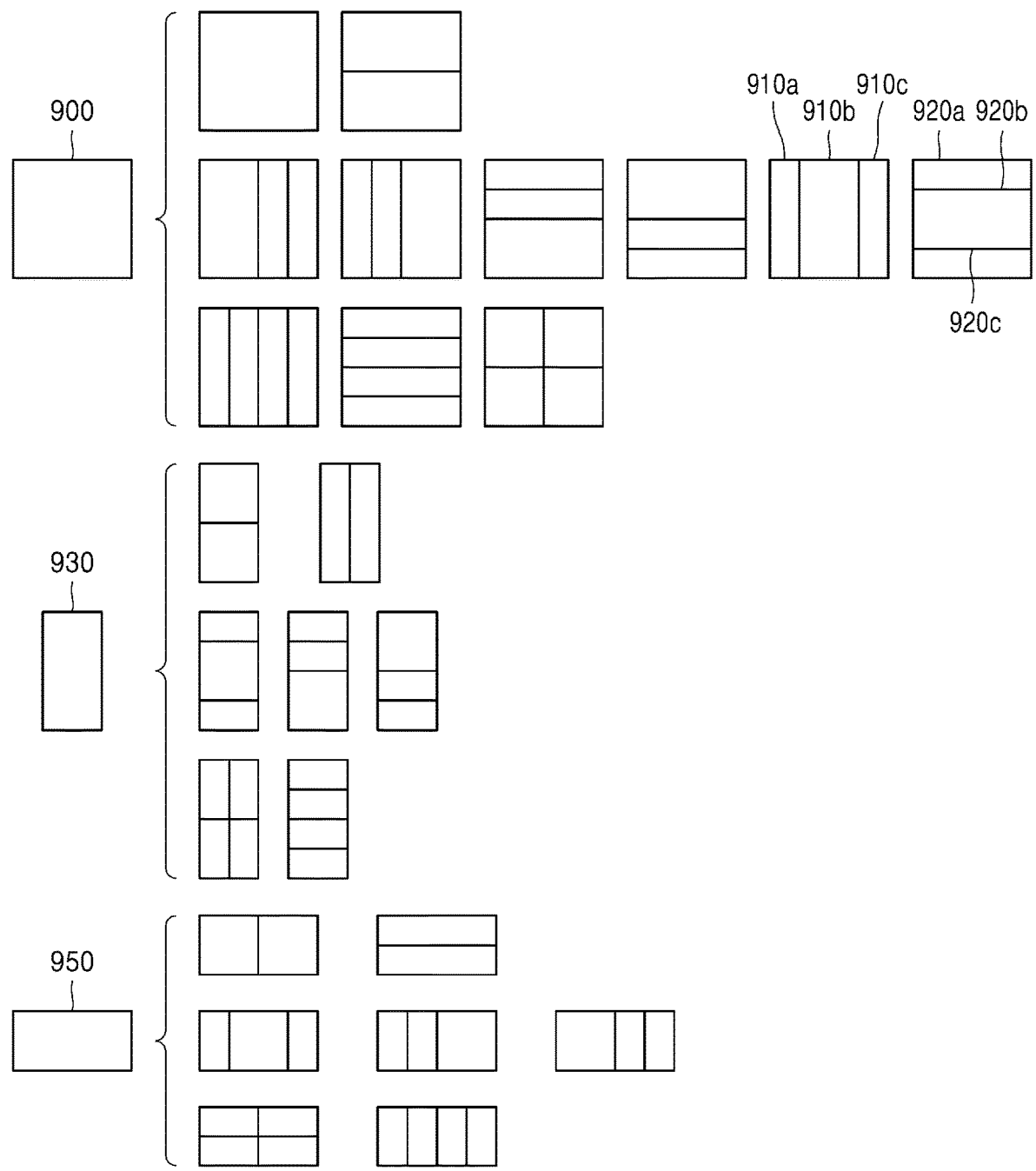
FIG. 9 illustrates a process of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on split shape mode information, which is obtained through the bitstream obtainer 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910*a*, 910*b*, and 910*c* determined by splitting the square first coding unit 900 in a vertical direction or second coding units 920*a*, 920*b*, and 920*c* determined by splitting the square first coding unit 900 in a horizontal direction.

According to an embodiment, the image decoding apparatus 100 may determine whether the second coding units 910*a*, 910*b*, 910*c*, 920*a*, 920*b*, and 920*c* included in the first coding unit 900 satisfy a condition for processing in a preset order, and the condition relates to whether at least one of a width and height of the first coding unit 900 is to be split in half along a boundary of the second coding units 910*a*, 910*b*, 910*c*, 920*a*, 920*b*, and 920*c*. Referring to FIG. 9, because boundaries of the second coding units 910*a*, 910*b*, and 910*c* determined by splitting the square first coding unit 900 in a vertical direction do not split the width of the first coding unit 900 in half, it may be determined that the first coding unit 900 does not satisfy the condition for processing in the preset order. Also, because boundaries of the second coding units 920*a*, 920*b*, and 920*c* determined by splitting the square first coding unit 900 in a horizontal direction do not split the height of the first coding unit 900 in half, it may be determined that the first coding unit 900 does not satisfy the condition for processing in the preset order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a preset restriction on a coding unit at a preset location from among the split coding units. The restriction or the preset location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
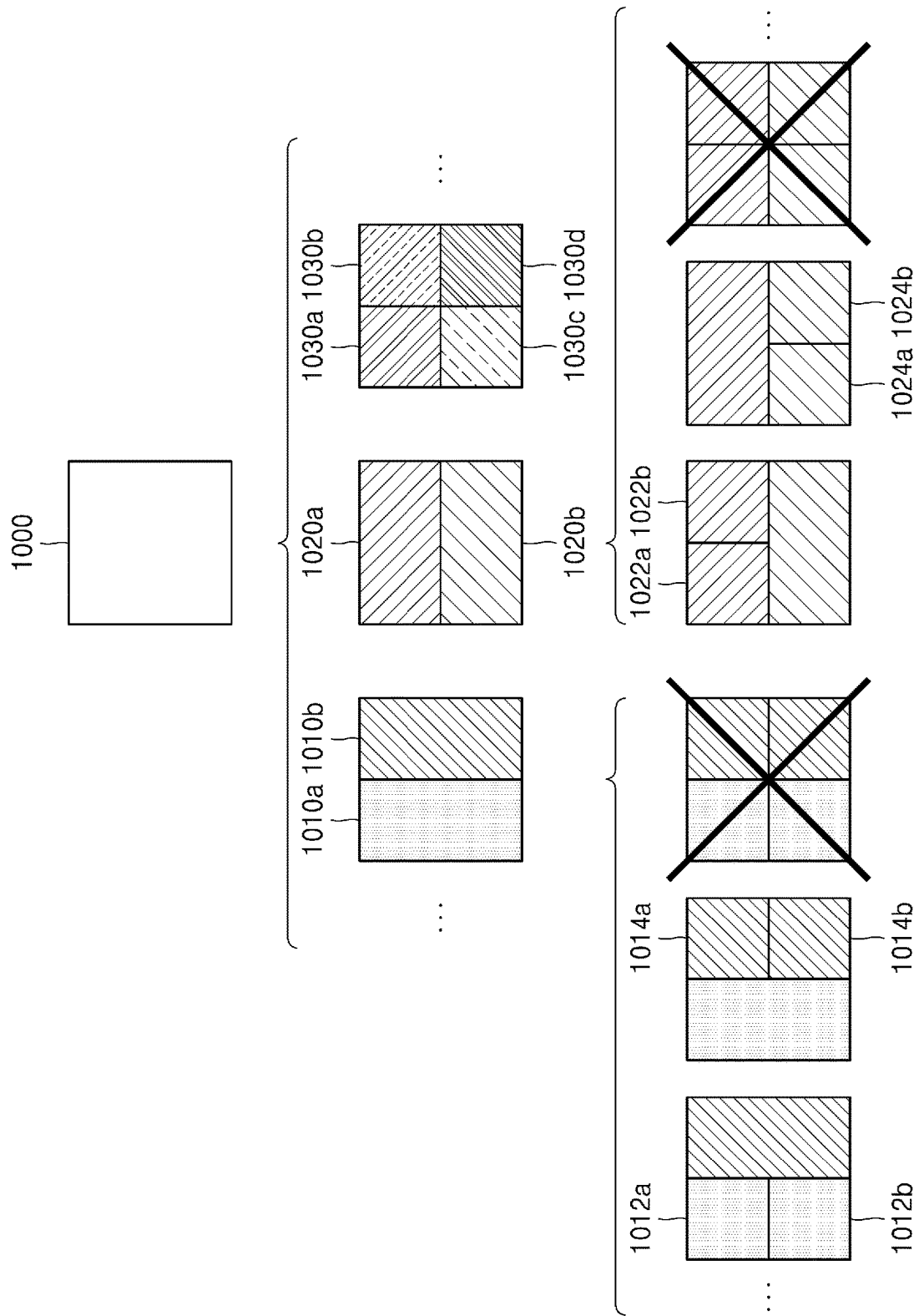
FIG. 10 illustrates that a shape into which a non-square second coding unit determined by splitting a first coding unit, is splittable is restricted when the second coding unit satisfies a preset condition, according to an embodiment.

FIG. 10 illustrates that a shape into which a second coding unit is splittable is restricted when the second coding unit having a non-square shape, which is determined when the image decoding apparatus 100 splits a first coding unit 1000, satisfies a preset condition, according to an embodiment.

According to an embodiment, the image decoding apparatus 100 may determine to split the square first coding unit 1000 into non-square second coding units 1010*a*, and 1010*b* or 1020*a* and 1020*b*, based on split shape mode information, which is obtained by the bitstream obtainer 110. The second coding units 1010*a* and 1010*b*, or 1020*a* and 1020*b* may be independently split. As such, the image decoding apparatus 100 may determine to split or not to split each of the second coding units 1010*a* and 1010*b*, or 1020*a* and 1020*b* into a plurality of coding units, based on the split shape mode information of each of the second coding units 1010*a* and 1010*b*, or 1020*a* and 1020*b*. According to an embodiment, the image decoding apparatus 100 may determine third coding units 1012*a* and 1012*b* by splitting the non-square left second coding unit 1010*a*, which is determined by splitting the first coding unit 1000 in a vertical direction, in a horizontal direction. However, when the left second coding unit 1010*a* is split in a horizontal direction, the image decoding apparatus 100 may restrict the right second coding unit 1010*b* not to be split in a horizontal direction in which the left second coding unit 1010*a* is split. When third coding units 1014*a* and 1014*b* are determined by splitting the right second coding unit 1010*b* in a same direction, because the left and right second coding units 1010*a* and 1010*b* are independently split in a horizontal direction, the third coding units 1012*a* and 1012*b*, or 1014*a* and 1014*b* may be determined. However, this case serves equally as a case in which the image decoding apparatus 100 splits the first coding unit 1000 into four square second coding units 1030*a*, 1030*b*, 1030c, and 1030d, based on the split shape mode information, and may be inefficient in terms of image decoding.

According to an embodiment, the image decoding apparatus 100 may determine third coding units 1022a and 1022b, or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) not to be split in a vertical direction in which the upper second coding unit 1020a is split.

Figure 11:
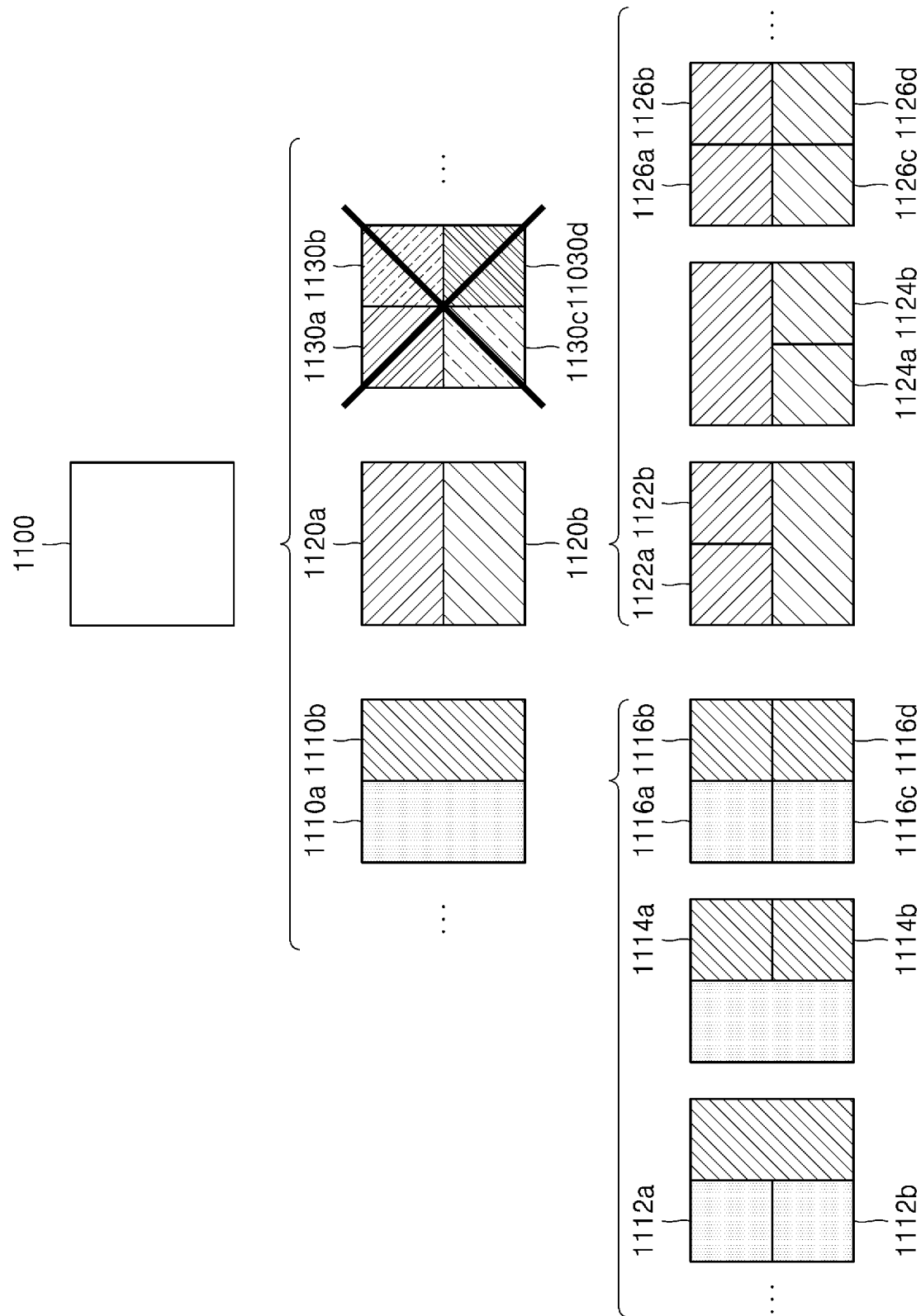
FIG. 11 illustrates a process of splitting a square coding unit when split shape mode information does not indicate splitting in units of four square coding units, according to an embodiment.

FIG. 11 illustrates a process, performed by the image decoding apparatus 100, of splitting a square coding unit when split shape mode information indicates that the square coding unit is not to be split into four square coding units, according to an embodiment.

According to an embodiment, the image decoding apparatus 100 may determine second coding units 1110a and 1110b, or 1120a and 1120b, etc. by splitting a first coding unit 1100, based on split shape mode information. The split shape mode information may include information about various methods of splitting a coding unit, but the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b, or 1120a and 1120b, etc., based on the split shape mode information.

According to an embodiment, the image decoding apparatus 100 may independently split the non-square second coding units 1110a and 1110b, or 1120a and 1120b, etc. Each of the second coding units 1110a and 1110b, or 1120a and 1120b, etc. may be recursively split in a preset order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
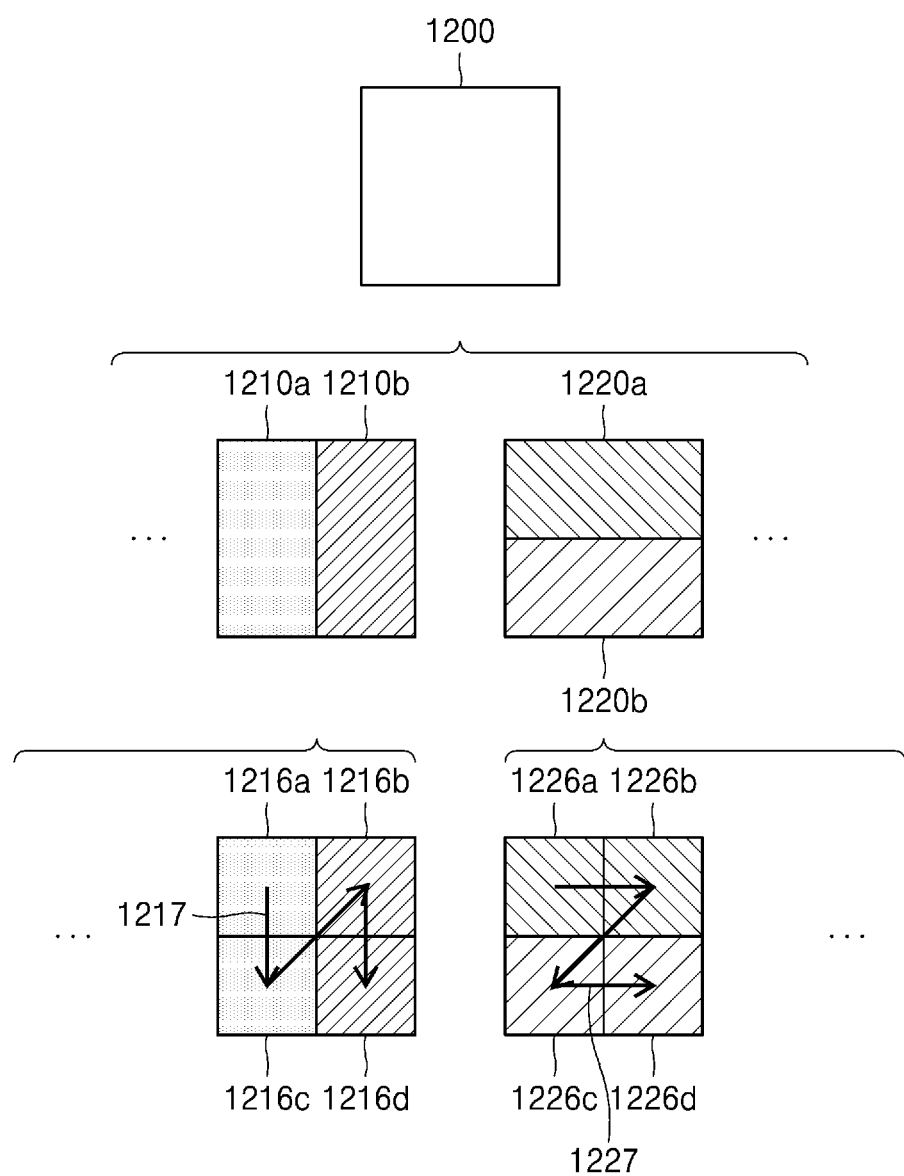
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210a and 1210b, or 1220a and 1220b, etc. by splitting the first coding unit 1200. Referring to FIG. 12, the non-square second coding units 1210a and 1210b, or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b, or 1220a and 1220b has been described above in relation to FIG. 11, and thus detailed descriptions thereof will not be provided herein.

According to an embodiment, the image decoding apparatus 100 may process coding units in a preset order. An operation of processing coding units in a preset order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a split shape by which the first coding unit 1200 is split.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a preset criterion. For example, the preset criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a lower depth.

Referring to FIG. 13, according to an embodiment, the image decoding apparatus 100 may determine a second coding unit 1302 and a third coding unit 1304 of lower depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of lower depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and a height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and a height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
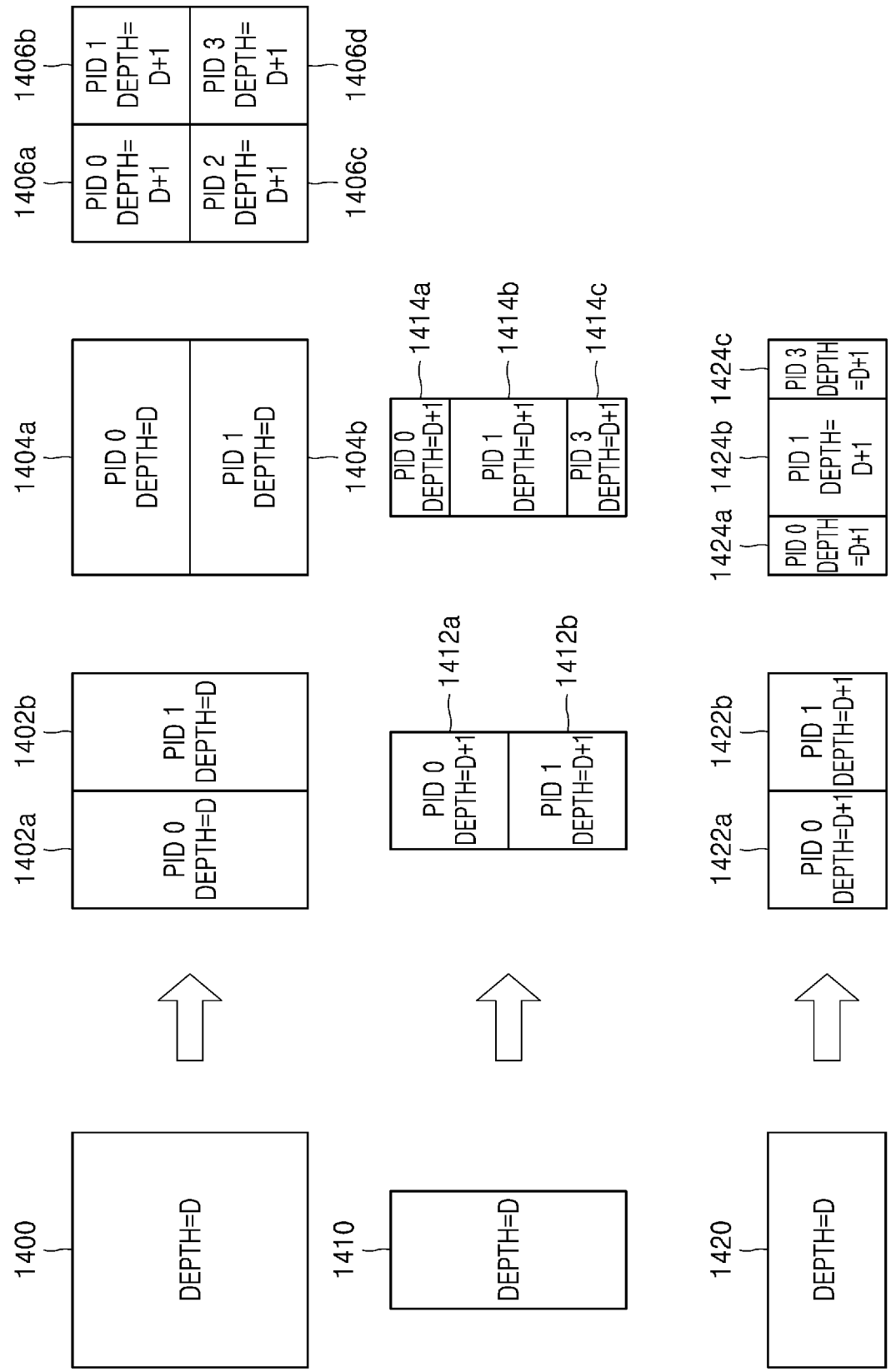
FIG. 14 illustrates depths that are determinable based on shapes and sizes of coding units, and part indexes (PIDs) for distinguishing the coding units, according to an embodiment.

FIG. 14 illustrates depths that are determinable based on shapes and sizes of coding units, and part indexes (PIDs) for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PI Ds for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs indicating respective coding units in order to identify the respective coding units. According to an embodiment, the PID may be obtained from a sample at a preset location of each coding unit (e.g., an upper-left sample).

According to an embodiment, the image decoding apparatus 100 may determine a coding unit at a preset location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a preset location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the preset location are not limited to the above-described examples, and various PIDs and various locations and sizes of coding units may be used.

According to an embodiment, the image decoding apparatus 100 may use a preset data unit where a coding unit starts to be recursively split.

Figure 15:
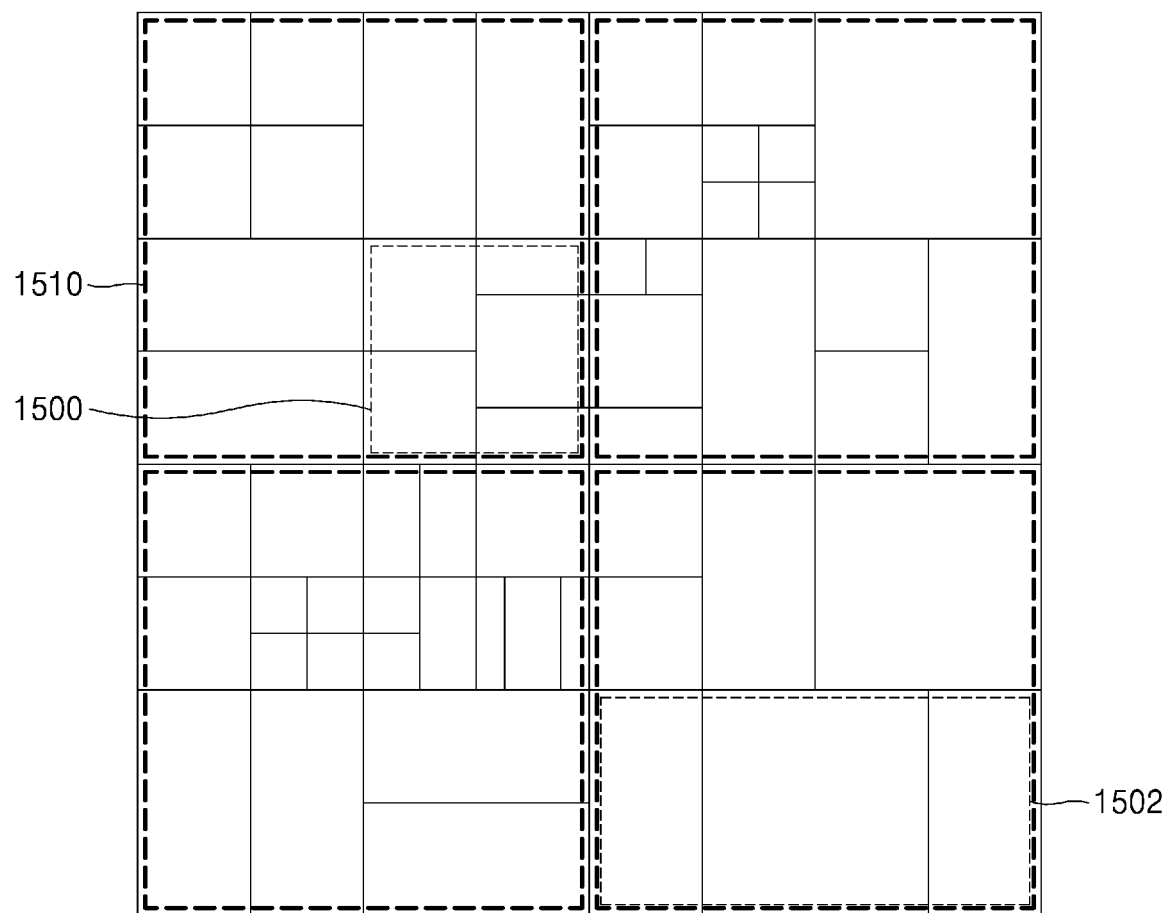
FIG. 15 illustrates that a plurality of coding units are determined based on a plurality of preset data units included in a picture, according to an embodiment.

FIG. 15 illustrates that a plurality of coding units are determined based on a plurality of preset data units included in a picture, according to an embodiment.

According to an embodiment, a preset data unit may be defined as a data unit where a coding unit starts to be recursively split by using split shape mode information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and a preset shape. According to an embodiment, a reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may predetermine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the bitstream obtainer 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units predetermined based on a preset condition. That is, the bitstream obtainer 110 may obtain, from the bitstream, only the PID for identifying the size and shape of reference coding units with respect to each slice, slice segment, tile, tile group, or largest coding unit which is a data unit satisfying a preset condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the preset condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be predetermined. That is, the image decoding apparatus 100 may determine at least one of the size and shape of reference coding units included in a data unit serving as a unit for obtaining the PID, by selecting the predetermined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus

100 may determine the reference coding units by splitting the largest coding unit n times based on a quadtree structure, and may split the reference coding unit based on at least one of the block shape information and the split shape mode information according to various embodiments.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit or each reference coding unit, and may use the obtained syntax element.

Hereinafter, a method of determining a split rule, according to an embodiment of the disclosure will be described in detail.

The image decoding apparatus 100 may determine a split rule of an image. The split rule may be predetermined between the image decoding apparatus 100 and the image encoding apparatus 200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image encoding apparatus 200 and the image decoding apparatus 100 may predetermine to determine the split rule based on the block shape of the coding unit. However, embodiments of the disclosure are not limited thereto. The image decoding apparatus 100 may determine the split rule based on the information obtained from the bitstream received from the image encoding apparatus 200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule predetermined between the image encoding apparatus 200 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders is described above with reference to FIG. 12, details thereof are not provided again.

Figure 16:
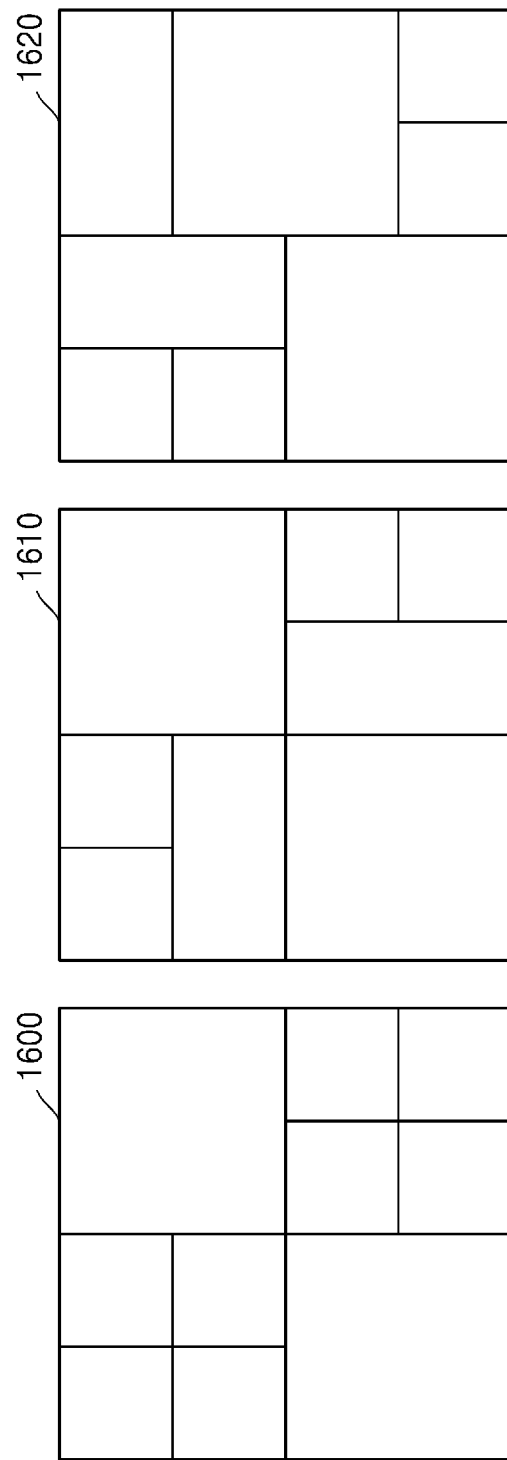
FIG. 16 illustrates coding units of individual pictures, when the individual pictures have different split shape combinations of coding units, according to an embodiment.

FIG. 16 illustrates coding units of individual pictures, when the individual pictures have different split shape combinations of coding units, according to an embodiment.

Referring to FIG. 16, the image decoding apparatus 100 may determine different split shape combinations of coding units for individual pictures. For example, the image decoding apparatus 100 may decode an image by using a picture 1600 that can be split into four coding units, a picture 1610 that can be split into two or four coding units, and a picture 1620 that can be split into two, three, or four coding units, among at least one picture included in the image. The image decoding apparatus 100 may use only split shape information indicating splitting into four square coding units, in order to split the picture 1600 into a plurality of coding units. The image decoding apparatus 100 may use only split shape information indicating splitting into two or four coding units, in order to split the picture 1610. The image decoding apparatus 100 may use only split shape information indicating splitting into two, three, or four coding units, in order to split the picture 1620. The above-described split shape combinations are embodiments for describing operations of the image decoding apparatus 100, and therefore, the above-described split shape combinations should not be interpreted to be limited to the above-described embodiments. It should be interpreted that various split shape combinations can be used for each preset data unit.

According to an embodiment, the bitstream obtainer 110 of the image decoding apparatus 100 may obtain a bitstream including an index representing a combination of split shape information for each preset data unit (for example, a sequence, a picture, a slice, a slice segment, a tile, a tile group, etc.). For example, the bitstream obtainer 110 may obtain an index representing a combination of split shape information from a sequence parameter set, a picture parameter set, a slice header, a tile header, or a tile group header. The bitstream obtainer 110 of the image decoding apparatus 100 may use the obtained index to determine a split shape combination into which coding units can be split for each preset data unit, and accordingly, the bitstream obtainer 110 may use different split shape combinations for individual preset data units.

FIG. 17 illustrates various shapes of coding units that can be determined based on split shape mode information, and that can be expressed with a binary code, according to an embodiment.

According to an embodiment, the image decoding apparatus 100 may split coding units into various shapes by using block shape information and split shape mode information obtained through the bitstream obtainer 110. Shapes into which coding units can be split may be various shapes including shapes described above through the embodiments.

Referring to FIG. 17, the image decoding apparatus 100 may split a coding unit having a square shape in at least one of a horizontal direction and a vertical direction, and may split a coding unit having a non-square shape in the horizontal direction or the vertical direction, based on split shape mode information.

According to an embodiment, when the image decoding apparatus 100 can split a coding unit having a square shape in the horizontal direction and the vertical direction to determine four square coding units, split shape mode information for a square coding unit may represent four split shapes. According to an embodiment, the split shape mode information may be expressed with a binary code of 2 digits, and each split shape may be assigned a binary code. For example, when a coding unit is not split, split shape mode information may be expressed as (00)b, when a coding unit is split in the horizontal direction and the vertical direction, split shape mode information may be expressed as (01)b, when a coding unit is split in the horizontal direction, split shape mode information may be expressed as (10)b, and when a coding unit is split in the vertical direction, split shape mode information may be expressed as (11)b.

According to an embodiment, when the image decoding apparatus 100 splits a coding unit having a non-square shape in the horizontal direction or the vertical direction, kinds of split shapes that can be represented by split shape mode information may depend on the number of coding units into which the coding unit is to be split. Referring to FIG. 17, the image decoding apparatus 100 may split a coding unit having a non-square shape into up to three coding units, according to an embodiment. Also, the image decoding apparatus 100 may split a coding unit into two coding units. In this case, split shape mode information may be expressed as (10)b. The image decoding apparatus 100 may split a coding unit into three coding units. In this case, split shape mode information may be expressed as (11)b. The image decoding apparatus 100 may determine not to split a coding unit. In this case, split shape mode information may be expressed as (0)b. That is, the image decoding apparatus 100 may use Variable Length Coding (VLC), instead of Fixed Length Coding (FLC), in order to use a binary code representing split shape mode information.

According to an embodiment, referring to FIG. 17, a binary code of split shape mode information representing that a coding unit is not split may be expressed as (0)b. In the case in which a binary code of split shape mode information representing that a coding unit is not split is set to (00)b, a binary code of split shape mode information of 2 bits may be all used although there is no split shape mode information set to (01)b. However, in the case in which three split shapes are used for a coding unit having a non-square shape, as shown in FIG. 17, the image decoding apparatus 100 can determine that a coding unit is not split by using a binary code (0)b of 1 bit as split shape mode information, thereby efficiently using a bitstream. However, split shapes of a coding unit having a non-square shape, which are represented by split shape mode information, should be not interpreted to be limited to three shapes shown in FIG. 17, and should be interpreted to be various shapes including the above-described embodiments.

Figure 18:
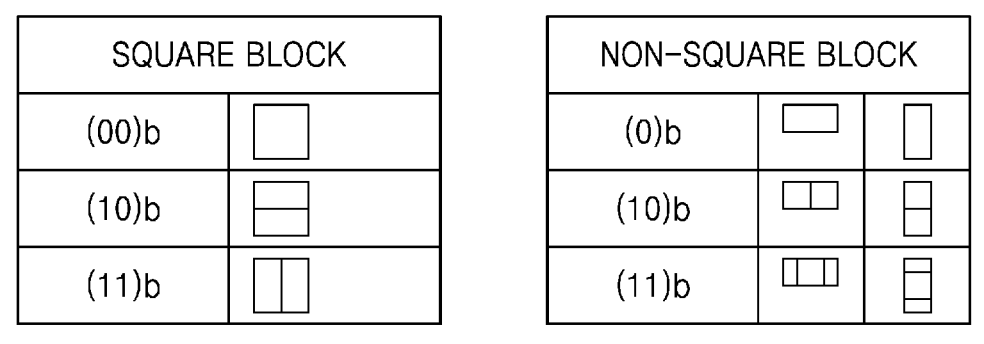

FIG. 18 illustrates other shapes of coding units that can be determined based on split shape mode information that can be represented with a binary code, according to an embodiment.

Referring to FIG. 18, the image decoding apparatus 100 may split a coding unit having a square shape in the horizontal direction or the vertical direction, and a coding unit having a non-square shape in the horizontal direction or the vertical direction, based on split shape mode information. That is, the split shape mode information may indicate splitting a coding unit having a square shape in one direction. In this case, a binary code of split shape mode information representing that a coding unit having a square shape is not split may be expressed as (0)b. In the case in which a binary code of split shape mode information representing that a coding unit is not split is set to (00)b, a binary code of split shape mode information of 2 bits may need to be all used although there is no split shape mode information set to (01)b. However, in the case in which three split shapes are used for a coding unit having a square shape, as shown in FIG. 18, the image decoding apparatus 100 can determine that a coding unit is not split by using a binary code (0)b of 1 bit as split shape mode information, thereby efficiently using a bitstream. However, split shapes of a coding unit having a square shape, which are represented by split shape mode information, should be not interpreted to be limited to three shapes shown in FIG. 18, and should be interpreted to be various shapes including the above-described embodiments.

According to an embodiment, block shape information or split shape mode information may be expressed by using a binary code, and the block shape information or split shape mode information may be generated directly as a bitstream. Also, block shape information or split shape mode information that can be expressed with a binary code may be used as an input binary code in context adaptive binary arithmetic coding (CABAC), instead of being generated directly as a bitstream.

A process in which the image decoding apparatus 100 obtains a syntax for block shape information or split shape mode information through CABAC, according to an embodiment, will be described. The image decoding apparatus 100 may obtain a bitstream including a binary code for the syntax through the bitstream obtainer 110. The image decoding apparatus 100 may de-binarize a bin string included in the obtained bitstream to detect a syntax element representing block shape information or split shape mode information. According to an embodiment, the image decoding apparatus 100 may obtain a group of binary bin strings corresponding to a syntax element to be decoded, and decode the individual bins by using probability information. The image decoding apparatus 100 may repeat the operation until a bin string configured with the decoded bins is identical to one of previously obtained bin strings. The image decoding apparatus 100 may perform de-binarization on the bin string to determine a syntax element.

According to an embodiment, the image decoding apparatus 100 may perform a decoding process of adaptive binary arithmetic coding to determine a syntax for the bin string, and the image decoding apparatus 100 may update a probability model for the bins obtained through the bitstream obtainer 110. Referring to FIG. 17, the bitstream obtainer 110 of the image decoding apparatus 100 may obtain a bitstream that represents a binary code representing split shape mode information, according to an embodiment. The image decoding apparatus 100 may determine a syntax for the split shape mode information by using the obtained binary code having a size of 1 or 2 bits. The image decoding apparatus 100 may update a probability for each bit of the binary code of 2 bits, in order to determine the syntax for the split shape mode information. That is, based on whether a first bin of the binary code of 2 bits is has a value of 0 or 1, the image decoding apparatus 100 may update a probability that the next bin will have a value of 0 or 1 upon decoding.

According to an embodiment, in the process of determining the syntax, the image decoding apparatus 100 may update probabilities for the bins that are used in a process of decoding the bins of the bin string for the syntax, and the image decoding apparatus 100 may determine that a specific bit of the bin string has the same probability, without updating a probability of the specific bit.

Referring to FIG. 17, in a process of determining a syntax by using a bin string representing split shape mode information for a coding unit having a non-square shape, the image decoding apparatus 100 may determine a syntax for the split shape mode information by using a bin having a value of 0 in the case in which the coding unit having the non-square shape is not split. That is, when block shape information represents that a current coding unit has a non-square shape, a first bin of the bin string for the split shape mode information may be 0 in the case in which the coding unit having the non-square shape is not split, and may be 1 in the case in which the coding unit is split into two or three coding units. Accordingly, a probability that the first bin of the bin string of the split shape mode information for the coding unit having the non-square shape will be 0 may be ⅓, and a probability that the first bin will be 1 may be ⅔. Because split shape mode information representing that a coding unit having a non-square shape is not split can be expressed with a bin string of 1 bit having a value of 0, as described above, the image decoding apparatus 100 may only determine whether a second bin is 0 or 1 in the case in which the first bin of the split shape mode information is 1, to determine the syntax for the split shape mode information. According to an embodiment, when the first bin for the split shape mode information is 1, the image decoding apparatus 100 may determine that a probability that the second bin will be 0 is equal to a probability that the second bin will be 1, and decode the second bin.

Accordingly, the image decoding apparatus 100 may use, in the process of determining the bins of the bin string for the split shape mode information, various probabilities for the individual bins. According to an embodiment, the image decoding apparatus 100 may determine different probabilities of bins for split shape mode information according to a width of a current coding unit or a length of a longer side of the current coding unit. According to an embodiment, the image decoding apparatus 100 may determine different probabilities of bins for split shape mode information according to at least one of a shape of a current coding unit and a length of a longer side of the current coding unit. According to an embodiment, the image decoding apparatus 100 may determine different probabilities of bins for split shape mode information according to at least one of a shape of a current coding unit and a length of a longer side of the current coding unit.

According to an embodiment, the image decoding apparatus 100 may determine that probabilities of bins for split shape mode information are the same with respect to coding units that are equal to or larger than a preset size. For example, the image decoding apparatus 100 may determine that probabilities of bins for split shape mode information are the same with respect to coding units of which lengths of longer sides are equal to or greater than 64 samples.

According to an embodiment, the image decoding apparatus 100 may determine initial probabilities for bins constituting a bin string of split shape mode information based on a slice type (for example, an I slice, a P slice, or a B slice).

Figure 19:
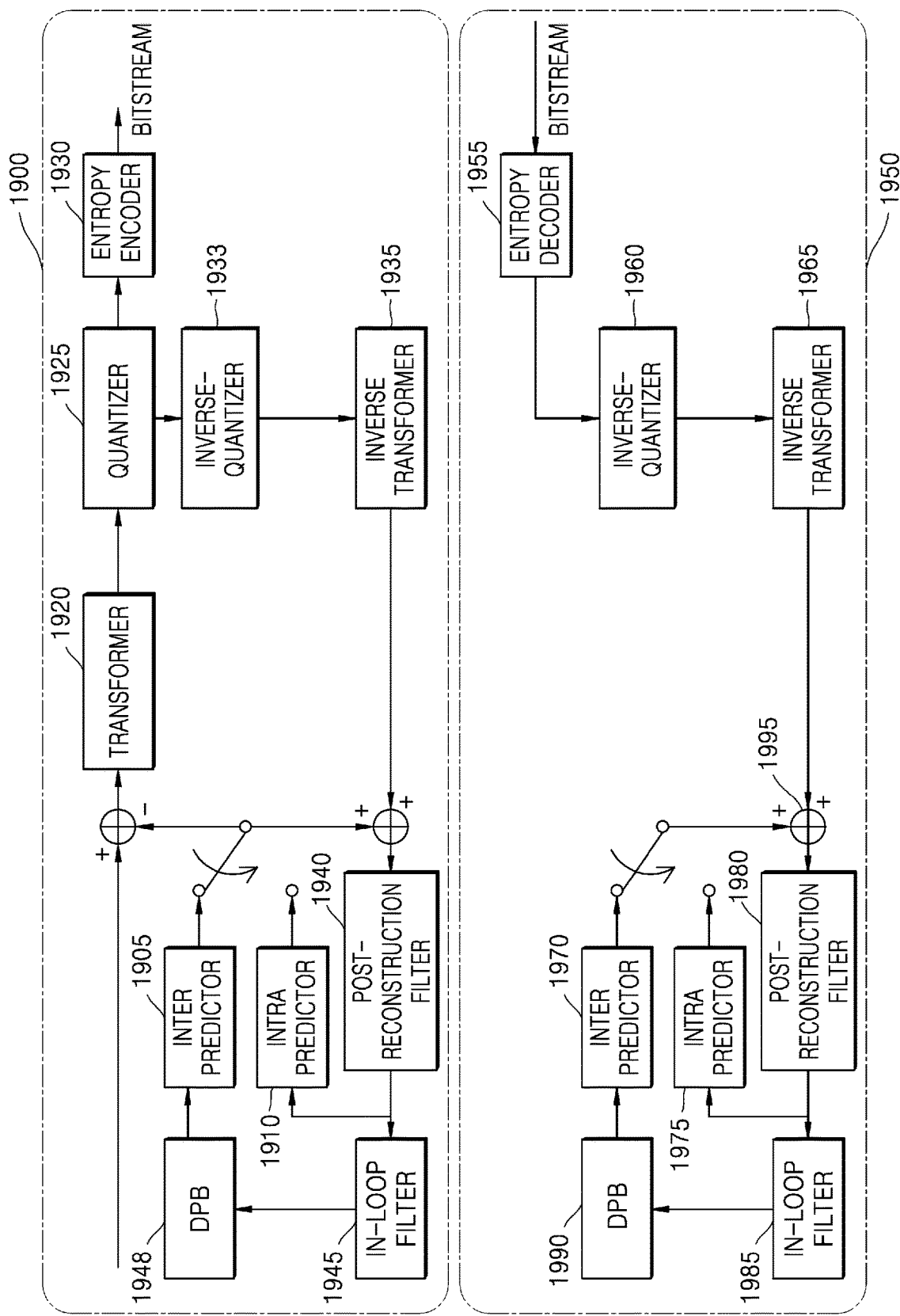
FIG. 19 is a block diagram of an image encoding and decoding system, according to an embodiment.

FIG. 19 is a block diagram of an image encoding and decoding system.

An encoder 1900 of an image encoding and decoding system may transmit an encoded bitstream of an image, and a decoder 1950 of the image encoding and decoding system may receive a bitstream and decode the bitstream to output a reconstructed image. Herein, the decoder 1950 may be a configuration that is similar to the image decoding apparatus 100.

In the encoder 1900, when a prediction mode of a current block is an inter prediction mode, an inter predictor 1905 generates motion information of the current block indicating a reference block of a reference picture temporally adjacent to a current picture. The inter predictor 1905 may determine prediction samples of a current block by using samples of reference blocks. To determine prediction samples of the current block by using neighboring samples spatially adjacent to the current block, the intra predictor 1910 may determine intra prediction information indicating a direction in which neighboring samples similar to the current block are located or a method of determining the prediction samples.

The inter predictor 1905 may determine reference samples that are to be used for predicting the current block, from among pre-reconstructed samples stored in a decoded picture buffer (DPB) 1948.

A transformer 1920 outputs transform coefficients by performing transformation on residual sample values obtained by subtracting the prediction samples generated by the inter predictor 1905 or the intra predictor 1910 from an original sample of the current block. A quantizer 1925 quantizes the transform coefficients output by the transformer 1920 to output quantized transform coefficients. The entropy encoder 1930 may encode the quantized transform coefficients to residual syntax elements including level values to output the quantized transform coefficients in the form of a bitstream.

The quantized transform coefficients output by the quantizer 1925 may be inversely quantized and inversely transformed through an inverse-quantizer 1933 and an inverse transformer 1935, and thus residual sample values may be generated again.

An adder adds the residual sample values to the prediction sample values to output a reconstructed sample value. A post-reconstruction filter 1940 may perform after-reconstruction filtering with respect to reconstructed samples, and reconstructed samples updated through after-reconstruction filtering may be used as reference sample values for intra prediction that is to be performed in the intra predictor 1910. The post-reconstruction filter 1940 may perform Hadamard transform domain filtering or bilateral filtering on the reconstructed sample values.

An in-loop filter 1945 may perform at least one of deblocking filtering and adaptive loop filtering on the reconstructed samples updated through after-reconstruction filtering. Reconstructed sample values updated through the filtering of the in-loop filter 1945 may be stored in the DPB 1948 and may be used as reference sample values for inter prediction to be performed by the inter predictor 1905.

An entropy decoder 1955 of the decoder 1950 may parse residual syntax elements including level values by performing entropy decoding on the received bitstream. The entropy decoder 1955 may reconstruct quantized transform coefficients from the residual syntax elements. The inverse-quantizer 1960 may output transform coefficients by performing inverse quantization on the quantized transform coefficients, and an inverse-transformer 1965 may output residual sample values by performing inverse transformation on the transform coefficients.

An inter predictor 1970 of the decoder 1950 may determine a reference picture temporally adjacent to a current picture by using motion information of a current block parsed by the entropy decoder 1955, and may determine a reference block within the reference picture. The inter predictor 1970 may determine prediction samples of the current block by using samples of reference blocks. An intra predictor 1975 of the decoder 1950 may determine reference samples spatially adjacent to the current block by using intra motion information and motion information of the current block parsed by the entropy decoder 1955, and may determine prediction samples of the current block by using the determined neighboring samples.

The inter predictor 1970 may determine reference samples that are to be used for predicting the current block, from among pre-reconstructed samples stored in a decoded picture buffer (DPB) 1990.

An adder 1995 of the decoder 1950 adds the residual sample values to the prediction sample values to output a reconstructed sample value of the current block. A post-reconstruction filter 1980 of the decoder 1950 may perform Hadamard transform domain filtering or bilateral filtering on the reconstructed sample values. Reconstructed samples updated through the after-reconstruction filtering of the post-reconstruction filter 1980 may be used as reference sample values for intra prediction that is to be performed in the intra predictor 1975.

An in-loop filter 1985 of the decoder 1950 may perform at least one of deblocking filtering and adaptive loop filtering on the reconstructed samples updated through after-reconstruction filtering. Reconstructed sample values updated through the filtering of the in-loop filter 1985 may be stored in the DPB 1990 and may be used as reference sample values for inter prediction to be performed by the inter predictor 1970.

Various embodiments described above describe operations related to an image decoding method that is performed by the image decoding apparatus 100. Hereinafter, operations of the image encoding apparatus 200 that performs an image encoding method corresponding to a reverse order of the image decoding method will be described through various embodiments.

Figure 2:
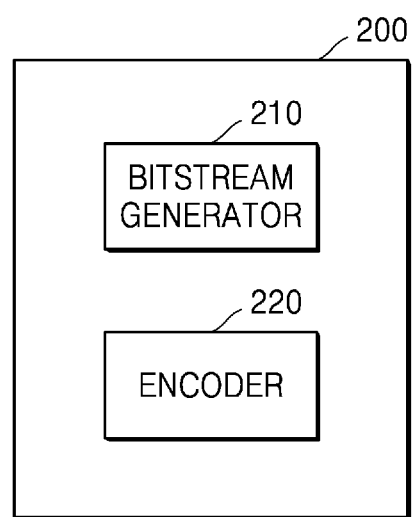
FIG. 2 is a block diagram of an image encoding apparatus according to an embodiment.

FIG. 2 is a block diagram of the image encoding apparatus 200 capable of encoding an image, based on at least one of block shape information and split shape mode information, according to an embodiment.

The image encoding apparatus 200 may include an encoder 220 and a bitstream generator 210. The encoder 220 may receive an input image and encode the input image. The encoder 220 may encode the input image to obtain at least one syntax element. The syntax element may include at least one of a skip flag, a prediction mode, a motion vector difference, a motion vector prediction method (or index), a transform quantized coefficient, a coded block pattern, a coded block flag, an intra prediction mode, a direct flag, a merge flag, a delta QP, a reference index, a prediction direction, or a transform index. The encoder 220 may determine a context model, based on block shape information including at least one of a shape, a direction, a ratio of a height and a width, or a size of a coding unit.

The bitstream generator 210 may generate a bitstream, based on an encoded input image. For example, the bitstream generator 210 may generate a bitstream by performing entropy encoding on a syntax element based on a context model. The image encoding apparatus 200 may transmit the bitstream to the image decoding apparatus 100.

According to an embodiment, the encoder 220 of the image encoding apparatus 200 may determine a shape of a coding unit. For example, a coding unit may have a square shape or a non-square shape, and information representing such a shape may be included in block shape information.

According to an embodiment, the encoder 220 may determine a shape into which a coding unit is to be split. The encoder 220 may determine a shape of at least one coding unit included in a coding unit, and the bitstream generator 210 may generate a bitstream including split shape mode information including information about the shape of the coding unit.

According to an embodiment, the encoder 220 may determine whether or not to split a coding unit. When the encoder 220 determines that a coding unit includes only one coding unit or that a coding unit is not split, the bitstream generator 210 may generate a bitstream including split shape mode information representing that the coding unit is not split. The encoder 220 may split a coding unit into a plurality of coding units included in the coding unit, and the bitstream generator 210 may generate a bitstream including split shape mode information representing that a coding unit is to be split into a plurality of coding units.

According to an embodiment, information representing the number of coding units into which a coding unit is split or a direction in which the coding unit is split may be included in the split shape mode information. For example, the split shape mode information may represent splitting in at least one direction of a vertical direction and a horizontal direction or may represent non-splitting.

The image encoding apparatus 200 may determine split shape mode information based on a split shape mode of a coding unit. The image encoding apparatus 200 may determine a context model, based on at least one of a shape, a direction, a ratio of a width and a height, or a size of the coding unit. The image encoding apparatus 200 may generate information about a split shape mode for splitting the coding unit as a bitstream based on the context model.

To determine the context model, the image encoding apparatus 200 may obtain an arrangement for corresponding at least one of a shape, a direction, a ratio of a width and a height, or a size of the coding unit to an index for the context model. The image encoding apparatus 200 may obtain the index for the context model, based on at least one of the shape, the direction, the ratio of the width and the height, or the size of the coding unit, from the arrangement. The image encoding apparatus 200 may determine the context model, based on the index for the context model.

To determine the context model, the image encoding apparatus 200 may determine the context model further based on block shape information including at least one of a shape, a direction, a ratio of a width and a height, or a size of a surrounding coding unit adjacent to the coding unit. The surrounding coding unit may include at least one of coding units located on the left-lower side, left side, left-upper side, upper side, right-upper side, right side, or right-lower side of the coding unit.

To determine the context model, the image encoding apparatus 200 may compare a length of a width of an upper surrounding coding unit with a length of the width of the coding unit. The image encoding apparatus 200 may compare lengths of heights of left and right surrounding coding units with a length of the height of the coding unit. The image encoding apparatus 200 may determine the context model, based on results of the comparisons.

Operations of the image encoding apparatus 200 include may be similar to those of the image decoding apparatus 100 described above with reference to FIGS. 3 to 19, and therefore, detailed descriptions thereof will be omitted.

Figure 20:
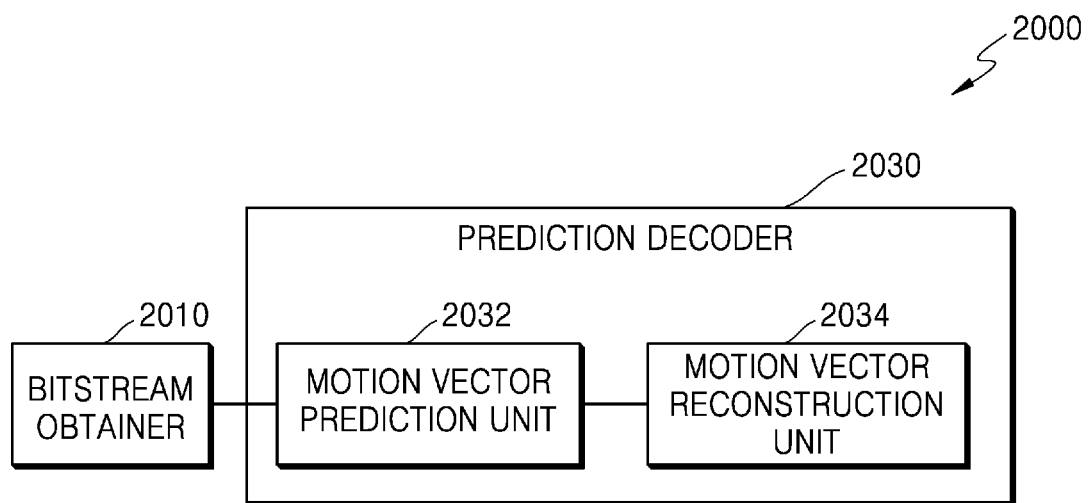
FIG. 20 is a block diagram of an image decoding apparatus according to an embodiment.

FIG. 20 is a block diagram of a structure of an image decoding apparatus 2000 according to an embodiment.

Referring to FIG. 20, the image decoding apparatus 2000 may include a bitstream obtainer 2010 and a prediction decoder 2030. The prediction decoder 2030 includes a motion vector prediction unit 2032 and a motion vector reconstruction unit 2034.

In embodiments, the bitstream obtainer 2010 shown in FIG. 20 may correspond to the bitstream obtainer 110 shown in FIG. 1, and the prediction decoder 2030 may correspond to the decoder 120 shown in FIG. 1.

The bitstream obtainer 2010 and the prediction decoder 2030, according to an embodiment, may be implemented as at least one processor. The image decoding apparatus 2000 may include one or more memories for storing input and output data of the bitstream obtainer 2010 and the prediction decoder 2030. The image decoding apparatus 2000 may include a memory controller for controlling data inputs and outputs of the memory.

The bitstream obtainer 2010 obtains a bitstream as a result of encoding of a picture. The bitstream obtainer 2010 obtains syntax elements for decoding a picture from the bitstream. Binary values corresponding to the syntax elements may be included in the bitstream according to a layer structure of a picture. The bitstream obtainer 2010 may obtain the syntax elements by entropy-decoding the binary values included in the bitstream.

The bitstream may include information about a prediction mode of a current block within a current picture. The current block may refer to a block of a largest coding unit, a coding unit, or a transformation unit split from the current picture desired to be decoded.

The prediction mode of the current block may include an intra prediction mode or an inter prediction mode. As described above, the inter prediction mode is a mode of reconstructing a current block from a reference block indicated by a motion vector of the current block within a reference picture.

The prediction decoder 2030 may reconstruct the current block by using intra prediction or inter prediction according to a prediction mode of the current block.

In the inter prediction mode, motion information may be used to reconstruct the current block. Motion information of the current block may include a prediction direction, a reference picture index, and a motion vector of the current block. The prediction direction, the reference picture index, and the motion vector of the current block may be confirmed from information included in the bitstream.

The prediction direction of the current block may be one of a list 0 direction, a list 1 direction, and a bidirection. The prediction direction being the list 0 direction refers to using a picture included in a reference picture list 0 as a reference picture of the list 0 direction, and the prediction direction being the list 1 direction refers to using a picture included in a reference picture list 1 as a reference picture of the list 1 direction. The prediction direction being the bidirection refers to using a picture included in a reference picture list 0 as a reference picture of the list 0 direction and using a picture included in a reference picture list 1 as a reference picture of the list 1 direction.

The reference picture index indicates a picture used as a reference picture of a block from among pictures included in the reference picture list 0 and/or the reference picture list 1. According to a reference picture index of the list 0 direction, a picture used as a reference picture of the reference picture list 0 is specified from among the pictures included in the list 0 direction. According to a reference picture index of the list 1 direction, a picture used as a reference picture of the reference picture list 1 is specified from among the pictures included in the list 1 direction.

The motion vector specifies a location of the reference block within the reference picture. A motion vector of the list 0 direction means a motion vector indicating a reference block within a reference picture of the list 0 direction, and a motion vector of the list 1 direction means a motion vector indicating a reference block within a reference picture of the list 1 direction.

When the prediction direction of the current block is the list 0 direction, the motion information of the current block includes at least one of information indicating that the prediction direction of the current block is the list 0 direction, the reference picture index of the list 0 direction, and the motion vector of the list 0 direction. When the prediction direction of the current block is the list 1 direction, the motion information of the current block includes at least one of information indicating that the prediction direction of the current block is the list 1 direction, the reference picture index of the list 1 direction, and the motion vector of the list 1 direction. When the prediction direction of the current block is the bidirection, the motion information of the current block includes at least one of information indicating that the prediction direction of the current block is the bidirection, the reference picture index of the list 0 direction, the reference picture index of the list 0 direction, the motion vector of the list 0 direction, and the motion vector of the list 1 direction.

According to an embodiment, when the prediction mode of the current block is an inter prediction mode, the bitstream obtainer 2010 may obtain information indicating the prediction direction of the current block and the reference picture index of the current block from the bitstream. The prediction decoder 2030 may obtain a differential motion vector of the current block from the information included in the bitstream and combine a prediction motion vector of the current block with the differential motion vector to obtain a motion vector of the current block.

The prediction decoder 2030 may reconstruct the current block, based on the prediction direction, the reference picture index, and the motion vector of the current block.

An example of a method, performed by the prediction decoder 2030, of obtaining the prediction motion vector of the current block will now be described in detail.

The motion vector prediction unit 2032 according to an embodiment may obtain the prediction motion vector by using motion vectors of neighboring blocks adjacent to the current block. The neighboring blocks, which are blocks at pre-determined locations used to obtain the prediction motion vector of the current block, are included in the current picture together with the current block.

The neighboring blocks may include a block A0, a block A1, a block B0, a block B1, and a block B2.

The motion vector prediction unit 2032 may identify locations of the block A0, the block A1, the block B0, the block B1, and the block B2, based on information indicating the availability of left and right blocks of the current block.

In a related art video codec, decoding in a raster scan direction may be conducted on a picture. In this case, the left block of the current block may be completely decoded before the current block and may be available for the current block, and the right block of the current block is not completely decoded before the current block and may be not available for the current block.

In embodiments, a direction of decoding blocks split from a picture may be adaptively determined. In other words, coding efficiency may be improved by decoding some of the blocks split from the picture in a direction from the right to the left instead of decoding all of the blocks split from the picture in a raster scan direction. Accordingly, the right block of the current block may be available and the left block of the current block may be not available, or the left and right blocks of the current block may both be available.

A determination about whether the left block and the right block are available may be made in the same manner as a determination about availability of a first neighboring block which is described below.

Locations of the neighboring blocks that vary according to the availability of the left and right blocks of the current block will be described below with reference to FIGS. 21A through 21C.

Figure 21A:
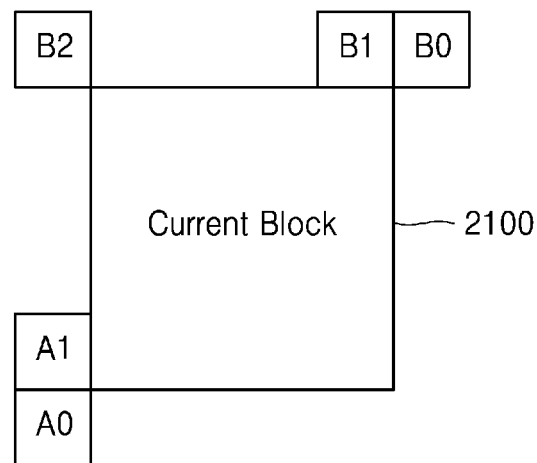
FIG. 21A illustrates locations of neighboring blocks when a left block of a current block is available, according to an embodiment.

FIG. 21A illustrates locations of neighboring blocks when a left block of a current block 2100 is available.

The locations of the neighboring blocks when the left block of the current block 2100 is available may be identical to locations of spatial neighboring blocks defined in the HEVC standard.

Referring to FIG. 21A, the neighboring blocks may include a left lower corner block A0, a left lower block A1, a right upper corner block B0, a right upper block B1, and a left upper corner block B2 of the current block 2100. As shown in FIG. 21A, the left lower block A1 may be located above the left lower corner block A0, and the right upper block B1 may be located on a left side of the right upper corner block B0.

Figure 21B:
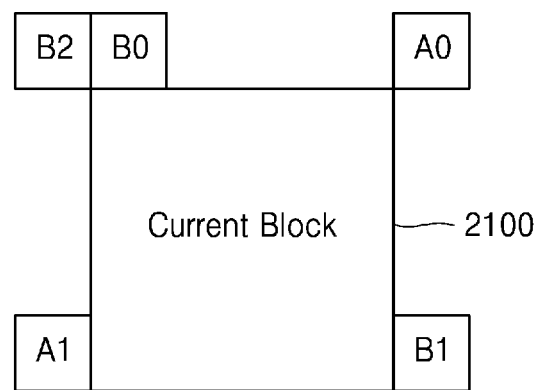
FIG. 21B illustrates locations of neighboring blocks when a left block and a right block of a current block are available, according to an embodiment.

FIG. 21B illustrates locations of neighboring blocks when left and right blocks of the current block 2100 are both available.

Referring to FIG. 21B, the neighboring blocks may include a right upper corner block A0, a left lower block A1, a left upper corner block B0, a right lower block B1, and a left upper block B2 of the current block 2100. As shown in FIG. 21B, the left upper corner block B2 may be located on a left side of the left upper block B0.

Figure 21C:
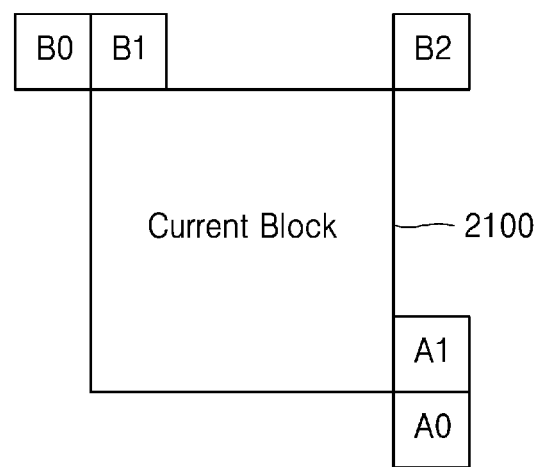
FIG. 21C illustrates locations of neighboring blocks when a right block of a current block is available, according to an embodiment.

FIG. 21C illustrates locations of neighboring blocks when the right block of the current block 2100 is available.

Referring to FIG. 21C, the neighboring blocks may include a right lower corner block A0, a right lower block A1, a left upper corner block B0, a left upper block B1, and a right upper corner block B2 of the current block 2100. As shown in FIG. 21C, the right lower block A1 may be located above the right lower corner block A0, and the left upper block B1 may be located on a right side of the left upper corner block B0.

The locations of the neighboring blocks shown in FIGS. 21A through 21C are merely an example. According to embodiments, the locations of the neighboring blocks and the number of neighboring blocks may vary.

The motion vector prediction unit 2032 may determine the availability of the left and right blocks of the current block, and may specify the locations of the neighboring blocks to be used to obtain the prediction motion vector of the current block, from the information indicating the availability of the left and right blocks of the current block.

According to an embodiment, the motion vector prediction unit 2032 selects the first neighboring block from information obtained from the bitstream. The first neighboring block may be one of a block A0, a block A1, a block B0, a block B1, and a block B2 corresponding to the neighboring blocks.

According to an embodiment, the information obtained from the bitstream may be information indicating motion vector resolution of the current block. The motion vector prediction unit 2032 may confirm the information indicating motion vector resolution of the current block according to the information obtained from the bitstream from among a plurality of pre-determined motion vector resolutions, and may select the first neighboring block for obtaining the prediction motion vector.

The motion vector resolution may refer to precision of a location of a pixel that may be indicated by a motion vector determined through inter prediction from among the pixels included in the reference picture (or an interpolated reference picture). The motion vector resolution having an N pixel unit (where N is a rational number) means that a motion vector may have precision of an N pixel unit. For example, motion vector resolution of a ¼ pixel unit may mean that a motion vector may indicate a pixel of a ¼ pixel unit (i.e., a subpixel unit) in an interpolated reference picture, and motion vector resolution of a 1 pixel unit may mean that a motion vector may indicate a pixel of a 1 pixel unit (i.e., an integer pixel unit) in an interpolated reference picture. A motion vector resolution capable of expressing the motion vector of the current block from among several motion vector resolutions may be adaptively determined.

According to an embodiment, the information indicating the motion vector resolution, which is obtained from the bitstream, may indicate a first neighboring block from among neighboring blocks at different locations while indicating one motion vector resolution from among several motion vector resolutions.

FIG. 22 is a table showing a matching relationship between indexes of motion vector resolutions, the motion vector resolutions, and locations of neighboring blocks.

Referring to FIG. 22, a motion vector resolution and a neighboring block corresponding to the first neighboring block may be determined according to the values of an AMVR index. For example, when the AMVR index is 0, the motion vector resolution of the current block may be selected as a ¼-pixel unit (pel), and the first neighboring block may be selected as the block A1. When the AMVR index is 1, the motion vector resolution of the current block may be selected as a ½-pixel unit (pel), and the first neighboring block may be selected as the block B1.

In the HEVC standard, several neighboring blocks are included in a candidate list, and a motion vector of a neighboring block in the candidate list selected from information signaled through a bitstream is used as a prediction motion vector. However, according to embodiments, a first neighboring block used to obtain a prediction motion vector of a current block may be specified according to information obtained from a bitstream, namely, information indicating motion vector resolution of the current block. Accordingly, special information (for example, mvp_l0_flag and mvp_l1_flag in HEVC) indicating one neighboring block included in a candidate list is not included in a bitstream.

The motion vector prediction unit 2032 determines the availability of the first neighboring block selected according to the information indicating the motion vector resolution. In detail, the motion vector prediction unit 2032 determines the availability of the first neighboring block according to at least one of whether a tile including the first neighboring block is different from a tile including the current block, whether the first neighboring block is located outside the current picture, whether the first neighboring block has been intra-predicted, and whether reconstruction of the first neighboring block has been completed.

For example, when any one of the following four conditions is satisfied, the motion vector prediction unit 2032 may determine that the first neighboring block is not available.

(Condition 1) The tile including the first neighboring block is different from the tile including the current block.

(Condition 2) The first neighboring block is located outside the current picture.

(Condition 3) The first neighboring block is not reconstructed.

(Condition 4) The first neighboring block has been coded in an intra prediction mode or an intra block copy (IBC) mode.

In the IBC mode, a prediction block corresponding to the current block is searched from the current picture. The prediction block may be found through motion estimation with respect to the current picture. For example, the prediction block may be searched in the current picture in units of integer pixels, and a positional relationship between the current block and a found prediction block may be signaled to a decoder.

According to an embodiment, when it is identified, from information indicating the availability of the first neighboring block, that the first neighboring block is available and a reference picture index of the first neighboring block of the same prediction direction as the prediction direction of the current block is not identical to a pre-determined value (for example, −1), the motion vector prediction unit 2032 may determine that the motion vector of the first neighboring block is available as the prediction motion vector. When the motion vector of the first neighboring block is available as the prediction motion vector, the motion vector prediction unit 2032 derives the prediction motion vector of the current block from the motion vector of the first neighboring block.

Even when it is identified, from the information indicating the availability of the first neighboring block, that the first neighboring block is not available or the first neighboring block is available, when the reference picture index of the first neighboring block of the same prediction direction as the prediction direction of the current block is identical to the pre-determined value, it may be determined that the motion vector of the first neighboring block is not available as the prediction motion vector. In this case, the motion vector prediction unit 2032 may obtain a default motion vector according to a default motion vector derivation procedure, an example of which is described below, and may obtain a prediction motion vector of the current block by using the default motion vector.

When the reference picture index of the first neighboring block of the same prediction direction as the prediction direction of the current block is not identical to the pre-determined value, this may mean that there is a motion vector of the first neighboring block that indicates a reference picture of the same prediction direction as the prediction direction of the current block. On the other hand, when the reference picture index of the first neighboring block of the same prediction direction as the prediction direction of the current block is identical to the pre-determined value, this may mean that there are no motion vectors of the first neighboring block that indicate a reference picture of the same prediction direction as the prediction direction of the current block.

The reference picture index of the first neighboring block includes a reference picture index of the list 0 direction and a reference picture index of the list 1 direction. The value of the reference picture index of the list 0 direction and the value of the reference picture index of the list 1 direction may be determined according to the prediction direction of the first neighboring block.

For example, when the prediction direction of the first neighboring block is the list 0 direction, the reference picture index of the list 0 direction is set as the value of an index (for example, ref_idx_l0) obtained from the bitstream, and the reference picture index of the list 1 direction is set as a pre-determined value. Because the pictures included in a reference picture list have indexes of 0 to n (where n is a natural number), the pre-determined value may be a value different from 0 to n, for example, −1.

When the prediction direction of the first neighboring block is the list 1 direction, the reference picture index of the list 1 direction is set as the value of an index (for example, ref_idx_l1) obtained from the bitstream, and the reference picture index of the list 0 direction is set as a pre-determined value.

When the prediction direction of the first neighboring block is a bidirection, the reference picture index of the list 0 direction and the reference picture index of the list 1 direction are both set as values of indexes (for example, ref_idx_l0 and ref_idx_l1) obtained from the bitstream.

An example of a case where the reference picture index of the first neighboring block of the same prediction direction as the prediction direction of the current block is identical to the pre-determined value or not identical to the pre-determined value will now be described with reference to FIGS. 23A through 23C.

Figure 23A:
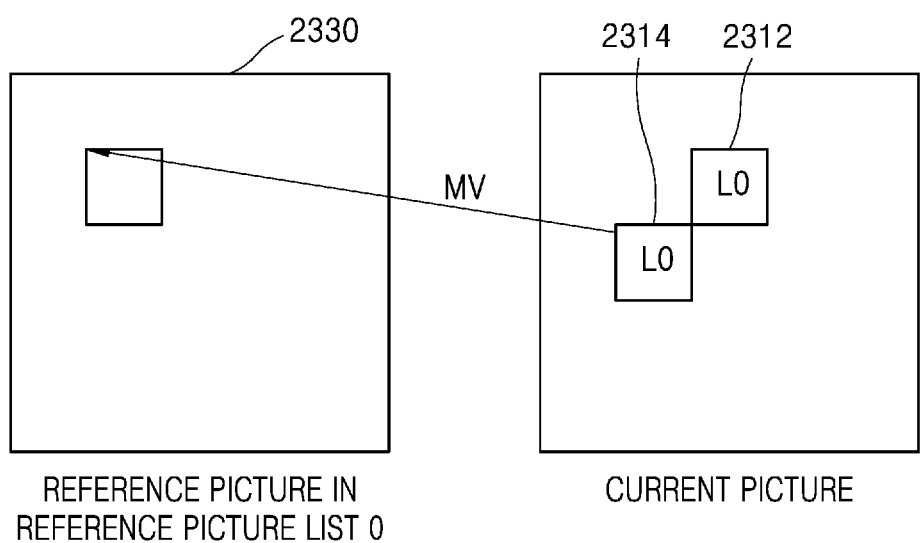
FIG. 23A illustrates a case where a reference picture index of a first neighboring block in a same prediction direction as a prediction direction of a current block is not identical to a pre-determined value, according to an embodiment.

FIG. 23A illustrates a case where a reference picture index of a first neighboring block in the same prediction direction as the prediction direction of a current block is not identical to a pre-determined value.

Referring to FIG. 23A, respective prediction directions of a current block 2312 and a first neighboring block 2314 are both the list 0 direction. Accordingly, a motion vector MV of the first neighboring block 2314 indicates a reference block within a reference picture 2330 included in a reference picture list 0. A reference picture index of the first neighboring block 2314 in the list 0 direction is set according to the information obtained from the bitstream, and a reference picture index of the first neighboring block 2314 in the list 1 direction is set as a pre-determined value. Because the reference picture index of the first neighboring block 2314 in the same prediction direction, namely, the list 0 direction, as the prediction direction of the current block 2312 is not identical to the pre-determined value, the motion vector prediction unit 2032 obtains a prediction motion vector of the current block 2312 by using the motion vector MV of the first neighboring block 2314.

Similarly, when the respective prediction directions of the current block 2312 and the first neighboring block 2314 are both the list 1 direction, because the reference picture index of the first neighboring block 2314 in the same prediction direction, namely, the list 1 direction, as the prediction direction of the current block 2312 is not identical to the pre-determined value, the motion vector prediction unit 2032 obtains a prediction motion vector of the current block 2312 by using the motion vector MV of the first neighboring block 2314.

Figure 23B:
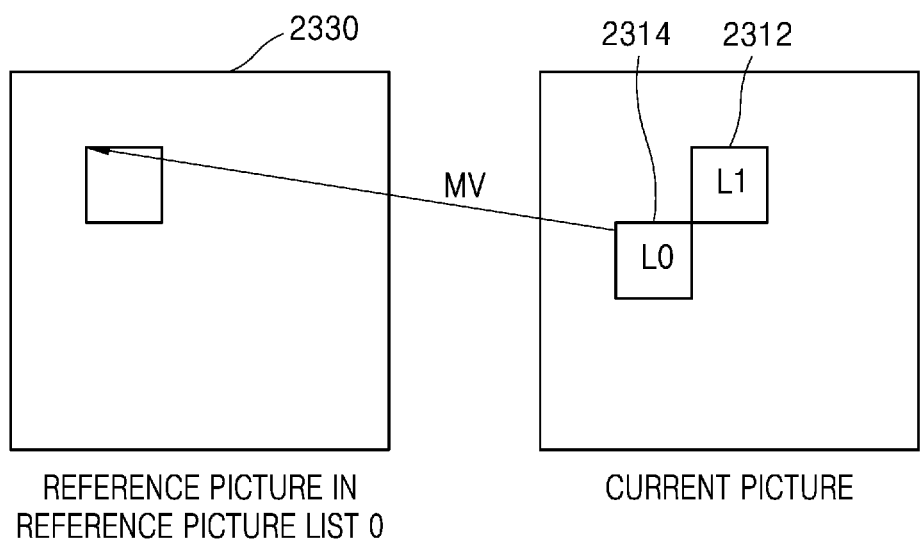
FIG. 23B illustrates a case where the reference picture index of the first neighboring block in the same prediction direction as the prediction direction of the current block is identical to the pre-determined value, according to an embodiment.

FIG. 23B illustrates a case where the reference picture index of the first neighboring block in the same prediction direction as the prediction direction of the current block is identical to the pre-determined value.

Referring to FIG. 23B, the prediction directions of the current block 2312 is the list 1 direction and the prediction directions of the first neighboring block 2314 is the list 0 direction. The motion vector MV of the first neighboring block 2314 indicates a reference block within the reference picture 2330 included in the reference picture list 0. A reference picture index of the first neighboring block 2314 in the list 0 direction is set according to the information obtained from the bitstream, and a reference picture index of the first neighboring block 2314 in the list 1 direction is set as a pre-determined value. Because the reference picture index of the first neighboring block 2314 in the same prediction direction, namely, the list 1 direction, as the prediction direction of the current block 2312 is identical to the pre-determined value, the motion vector prediction unit 2032 obtains a prediction motion vector of the current block 2312 by using a default motion vector which is described below.

Similarly, when the prediction direction of the current block 2312 is the list 0 direction and the prediction direction of the first neighboring block 2314 is the list 1 direction, because the reference picture index of the first neighboring block 2314 in the same prediction direction, namely, the list 0 direction, as the prediction direction of the current block 2312 is identical to the pre-determined value, the motion vector prediction unit 2032 obtains a prediction motion vector of the current block 2312 by using the default motion vector.

Figure 23C:
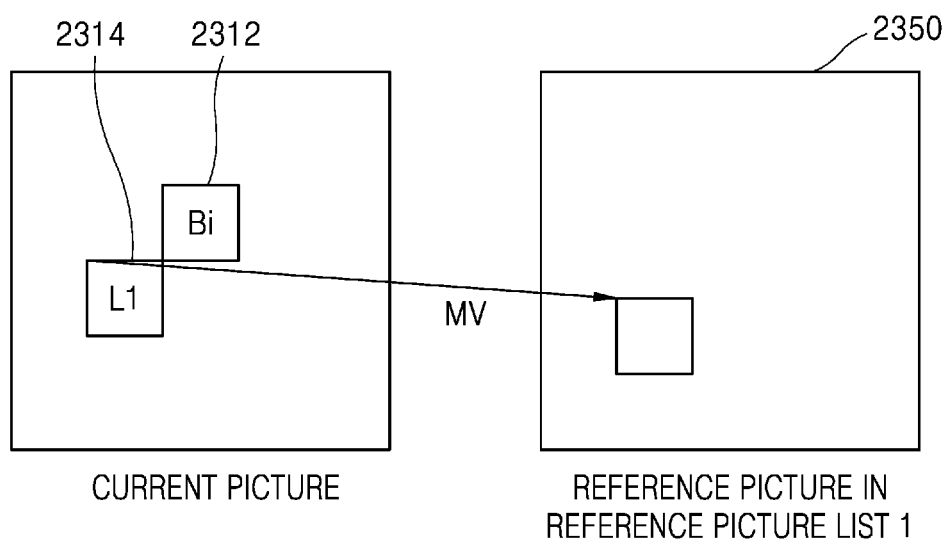
FIG. 23C illustrates a case where, when the prediction direction of the current block is a bidirection, one of the reference picture index of the first neighboring block in a list 0 direction and the reference picture index of the first neighboring block in a list 1 direction is identical to the pre-determined value and the other is not identical to the pre-determined value, according to an embodiment.

FIG. 23C illustrates a case where, when the prediction direction of the current block is a bidirection, one of the reference picture index of the first neighboring block in the list 0 direction and the reference picture index of the first neighboring block in the list 1 direction is identical to the pre-determined value and the other is not identical to the pre-determined value.

Referring to FIG. 23C, the prediction directions of the current block 2312 is a bidirection and the prediction directions of the first neighboring block 2314 is the list 1 direction. The motion vector MV of the first neighboring block 2314 indicates a reference block within a reference picture 2350 included in a reference picture list 1. A reference picture index of the first neighboring block 2314 in the list 0 direction is set as a pre-determined value, and a reference picture index of the first neighboring block 2314 in the list 1 direction is set according to the information obtained from the bitstream. As described above, the pre-diction direction being a bidirection includes both the list 0 direction and the list 1 direction. Because the reference picture index of the first neighboring block 2314 in the list 0 direction is identical to the pre-determined value, the motion vector prediction unit 2032 obtains a prediction motion vector of the current block 2312 in the list 0 direction by using the default motion vector. Because the reference picture index of the first neighboring block 2314 in the list 1 direction is not identical to the pre-determined value, the motion vector prediction unit 2032 obtains a prediction motion vector of the current block 2312 by using a motion vector MV of the first neighboring block 2314 in the list 1 direction.

When the prediction direction of the current block 2312 is a bidirection and the prediction direction of the first neighboring block 2314 is the list 0 direction, the motion vector prediction unit 2032 obtains a prediction motion vector of the current block 2312 in the list 1 direction by using a motion vector MV of the first neighboring block 2314 in the list 0 direction, and obtains a prediction motion vector of the current block 2312 in the list 1 direction by using the default motion vector.

In embodiments, when the first neighboring block is available and the reference picture index of the first neighboring block in the same prediction direction as the prediction direction of the current block is not identical to the pre-determined value, it is determined that the motion vector of the first neighboring block is available as the prediction motion vector. A prediction motion vector of the current block is obtained from the motion vector of the first neighboring block.

When it is determined that the motion vector of the first neighboring block is available as the prediction motion vector, and only a condition that the first neighboring block should be available is satisfied, the prediction motion vector of the first neighboring block is likely to be set as a zero vector, namely, (0, 0). In other words, when the first neighboring block is available but there are no motion vectors of the first neighboring block in the same prediction direction as the prediction direction of the current block, the motion vector of the first neighboring block may not be used as the prediction motion vector of the current block. Thus, the prediction motion vector of the current block may be determined as a zero vector, and consequently the number of bits necessary for expressing a differential motion vector may be increased.

In embodiments, when a condition that the first neighboring block should be available, and also a condition that a motion vector of the first neighboring block in the same prediction direction as the prediction direction of the current block should exist are both satisfied, the prediction motion vector of the current block is obtained using the motion vector of the first neighboring block, leading to a reduction of the number of bits necessary for expressing a differential motion vector.

An example of a process of deriving the default motion vector when the motion vector of the first neighboring block is not available as a prediction motion vector will now be described.

According to an embodiment, when the motion vector of the first neighboring block is not available as the prediction motion vector, the motion vector prediction unit 2032 may set the motion vector of a second neighboring block at a pre-determined location as the default motion vector. In embodiments, there may be a plurality of second neighboring blocks. In this case, the motion vector of the second neighboring block may be set as the default motion vector through a determination of the availabilities of a plurality of second neighboring blocks.

The second neighboring block may correspond to at least one of neighboring blocks. For example, the second neighboring block may include the block A1 and the block B1. As another example, the location of the second neighboring block may be different from the locations of the block A0, the A1 block, the block B0, the 131 block, and the B2 block.

When the second neighboring block includes the block A1 and the block B1, the locations of the block A1 and the block B1 may vary according to the availabilities of a left block and a right block of the current block, as described above. In detail, referring to FIGS. 21A through 21C, when the left block of the current block is available, the block A1 may be located on a left upper side of the current block, and the block B1 may be located on a right upper side of the current block. When the left and right blocks of the current block are both available, the block A1 may be located on a left lower side of the current block, and the block B1 may be located on a right lower side of the current block. When the right block of the current block is available, the block A1 may be located on a right lower side of the current block, and the block B1 may be located on a left upper side of the current block.

The motion vector prediction unit 2032 may determine the availability of the block A1, and, when the block A1 is identified as being available according to information indicating whether the block A1 is available, may determine a motion vector of the block A1 as the default motion vector. When the block A1 is not available, the motion vector prediction unit 2032 may determine the availability of the block B1, and, when the block B1 is identified as being available according to information indicating whether the block B1 is available, may determine a motion vector of the block B1 as the default motion vector. In other words, the motion vector prediction unit 2032 may check whether the motion vectors of the block A1 and the block B1 may be used as the default motion vector in an order of the block A1→the block B1, or the block A1 followed by the block B1.

The availability of the block A1 and the availability of the block B1 may be determined based on the above-described four conditions for determining the availability of the first neighboring block.

According to an embodiment, when the second neighboring block is identified as being available according to information indicating whether the second neighboring block is available and a reference picture index of the second neighboring block in the same prediction direction as the prediction direction of the current block is identical to a reference picture index of the current block or is not identical to a pre-determined value (i.e., when there is a motion vector of the second neighboring block in the same prediction direction as the prediction direction of the current block), the motion vector prediction unit 2032 may set the motion vector of the second neighboring block as the default motion vector.

When it is identified, from information indicating availability of the second neighboring block, that the second neighboring block is not available or there are no motion vectors of the second neighboring block in the same prediction direction as the prediction direction of the current block, the motion vector prediction unit 2032 may set the motion vector of a block decoded before the current block as the default motion vector.

The motion vector prediction unit 2032 may determine the motion vector of the first neighboring block or the default motion vector as the prediction motion vector of the current block.

When the motion vector of the first neighboring block is determined as the prediction motion vector and the reference picture index of the first neighboring block in the same prediction direction as the prediction direction of the current block is not identical to the reference picture index of the current block, the motion vector prediction unit 2032 may update the prediction motion vector of the current block by scaling the prediction motion vector of the current block according to a distance between the current picture and the reference picture of the current block and a distance between the current picture and the reference picture of the first neighboring block.

According to an embodiment, when the reference picture index of the second neighboring block (or for example the block decoded before the current block, which may be the block being used to obtain the default motion vector) in the same prediction direction as the prediction direction of the current block is identical to the reference picture index of the current block, the motion vector prediction unit 2032 may determine the default motion vector as the prediction motion vector of the current block. When the reference picture index of the second neighboring block (or for example the block decoded before the current block, which may be the block being used to obtain the default motion vector) in the same prediction direction as the prediction direction of the current block is not identical to the reference picture index of the current block, the motion vector prediction unit 2032 may scale the default motion vector according to the distance between the current picture and the reference picture of the current block and a distance between the current picture and the reference picture of the second neighboring block (or the block decoded before the current block) and may determine the scaled default motion vector as the prediction motion vector of the current block.

After obtaining the prediction motion vector of the current block, the motion vector prediction unit 2032 may adjust the prediction motion vector of the current block when the motion vector resolution of the current block is different from a pre-determined motion vector resolution (for example, a minimum motion vector resolution from among a plurality of the motion vector resolutions). The reason for adjusting the prediction motion vector is to match the motion vector resolution of the current block with the resolution of the prediction motion vector.

In order to adjust a prediction motion vector expressed in a coordinate within a picture interpolated according to the minimum motion vector resolution to the motion vector resolution of the current block, the motion vector prediction unit 2032 may adjust the prediction motion vector so that the prediction motion vector indicates neighboring pixels instead of a pixel indicated by the prediction motion vector.

For example, when the minimum motion vector resolution is a ¼ pixel unit and the motion vector resolution of the current block is a 1 pixel unit, the motion vector prediction unit 2032 may adjust a prediction motion vector of (19, 27) to (20, 28). This is because, when the minimum motion vector resolution is a ¼ pixel unit, an integer pixel has a coordinate of (4n, 4m) within an interpolated picture, where n and m may be integers.

According to an embodiment, when adjusting the prediction motion vector according to the motion vector resolution of the current block, the motion vector prediction unit 2032 may allow an adjusted prediction motion vector to indicate a pixel located on a right upper side of a pixel indicated by the prediction motion vector not yet adjusted. According to another embodiment, the motion vector prediction unit 2032 may allow the adjusted prediction motion vector to indicate a pixel located on a left upper side of the pixel indicated by the prediction motion vector not yet adjusted, a pixel located on a left lower side of the pixel indicated by the prediction motion vector not yet adjusted, or a pixel located on a right lower side of the pixel indicated by the prediction motion vector not yet adjusted.

Accordingly, when the motion vector of the first neighboring block is available as the prediction motion vector, the motion vector of the first neighboring block is determined as the prediction motion vector of the current block. When the reference picture index of the first neighboring block in the same prediction direction as the prediction direction of the current block is not identical to the reference picture index of the current block, the prediction motion vector is scaled. When the motion vector resolution of the current block is not identical to a pre-determined motion vector resolution from among the plurality of motion vector resolutions, the prediction motion vector or the scaled prediction motion vector is adjusted according to the motion vector resolution of the current block.

When the motion vector of the first neighboring block is not available as the prediction motion vector, the default motion vector is derived. When the reference picture index of a block of the same prediction direction as the prediction direction of the current block, which may be the block used to derive the default motion vector, is not identical to the reference picture index of the current block, the default motion vector is scaled, and the scaled default motion vector is determined as the prediction motion vector of the current block. When the motion vector resolution of the current block is not identical to the pre-determined motion vector resolution from among the plurality of motion vector resolutions, the prediction motion vector is adjusted according to the motion vector resolution of the current block.

The motion vector reconstruction unit 2034 obtains the motion vector of the current block by combining the prediction motion vector of the current block with a differential motion vector obtained from the bitstream. The motion vector reconstruction unit 2034 may obtain the motion vector of the current block by adding the prediction motion vector of the current block to the differential motion vector.

The prediction decoder 2030 may reconstruct the current block by inter-predicting the current block according to the prediction direction, the reference picture index, and the motion vector of the current block.

Figure 24:
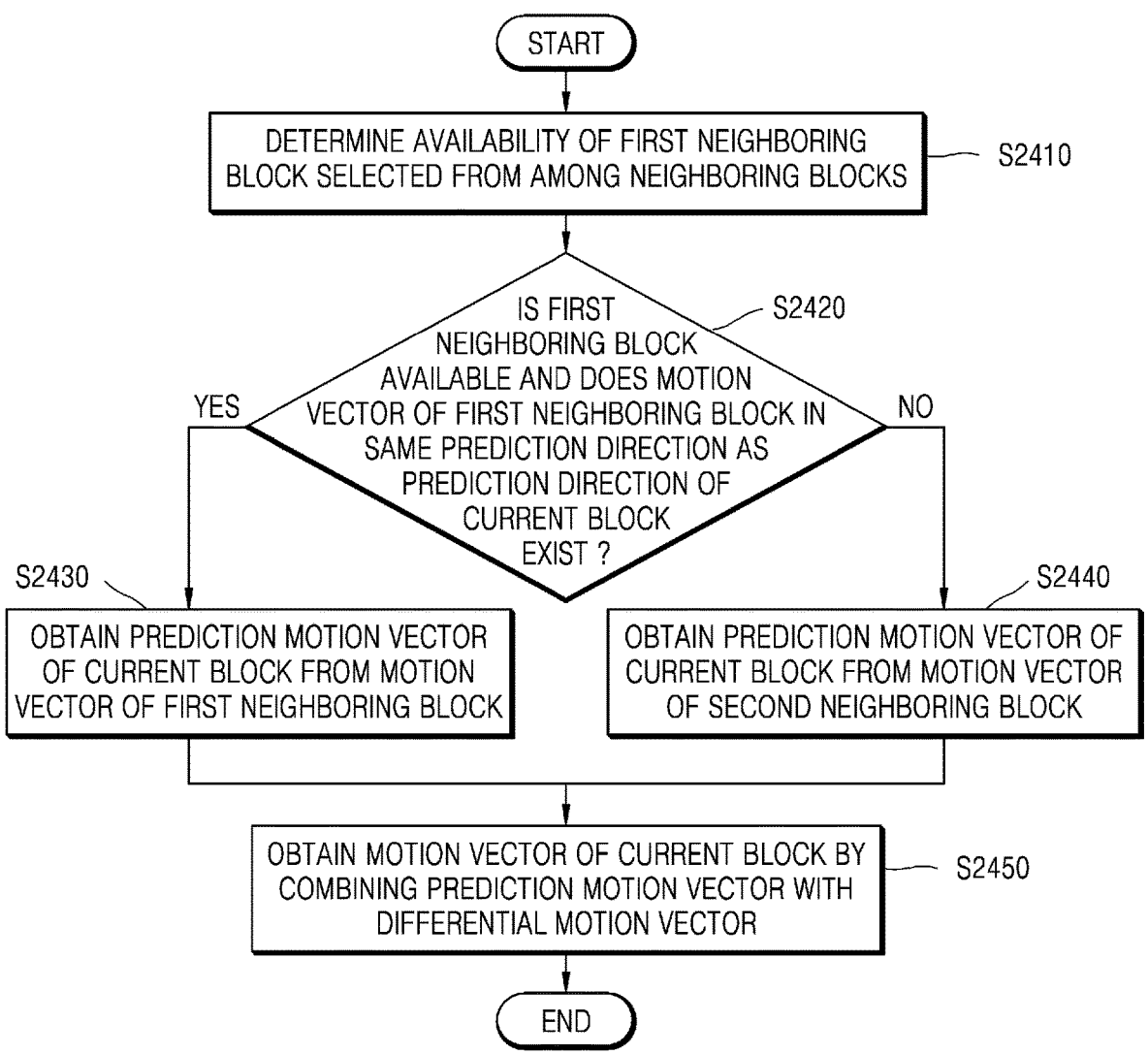
FIG. 24 is a flowchart of a method of decoding a motion vector, according to an embodiment.

FIG. 24 is a flowchart of a method of decoding a motion vector, according to an embodiment.

In operation S2410, an image decoding apparatus 2000 determines availability of the first neighboring block selected according to the information obtained from the bitstream from among the neighboring blocks adjacent to the current block.

According to an embodiment, the information obtained from the bitstream may include information indicating the motion vector resolution of the current block from among the plurality of motion vector resolutions.

In operation S2420, the image decoding apparatus 2000 determines whether the first neighboring block is available and the motion vector of the first neighboring block of the same prediction direction as the prediction direction of the current block exists.

In operation S2430, when the first neighboring block is available and the motion vector of the first neighboring block of the same prediction direction as the prediction direction of the current block exists, the image decoding apparatus 2000 obtains the prediction motion vector of the current block from the motion vector of the first neighboring block.

In operation S2440, when the first neighboring block is not available or the motion vector of the first neighboring block of the same prediction direction as the prediction direction of the current block does not exist, the image decoding apparatus 2000 obtains the prediction motion vector of the current block from the motion vector of the second neighboring block.

As described above, when the second neighboring block is not available, the prediction motion vector of the current block may be obtained from the motion vector of the block decoded before the current block.

In operation S2450, the image decoding apparatus 2000 obtains the motion vector of the current block by combining the prediction motion vector of the current block with the differential motion vector.

Figure 25:
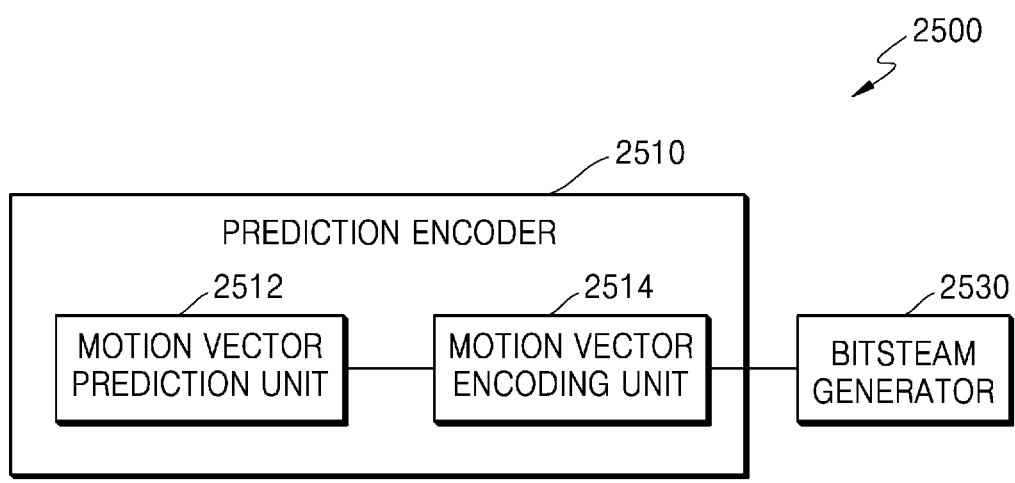
FIG. 25 is a block diagram of an image encoding apparatus according to an embodiment.

FIG. 25 is a block diagram of a structure of an image encoding apparatus 2500 according to an embodiment.

Referring to FIG. 25, the image encoding apparatus 2500 includes a prediction encoder 2510 and a bitstream generator 2530. The prediction encoder 2510 may include a motion vector prediction unit 2512 and a motion vector encoding unit 2514.

The prediction encoder 2510 may correspond to the encoder 220 shown in FIG. 2, and the bitstream generator 2530 may correspond to the bitstream generator 210 shown in FIG. 2.

The prediction encoder 2510 and the bitstream generator 2530, according to an embodiment, may be implemented as at least one processor. The image encoding apparatus 2500 may include one or more memories for storing input and output data of the prediction encoder 2510 and the bitstream generator 2530. The image encoding apparatus 2500 may include a memory controller for controlling data inputs and outputs of the memory.

The prediction encoder 2510 encodes a picture according to a prediction mode, and the bitstream generator 2530 generates a bitstream including information generated as a result of encoding the picture.

The prediction encoder 2510 may determine the prediction mode of the current block within the current picture. When the prediction mode of the current block is determined as an inter prediction mode, the bitstream generator 2530 includes motion information of the current block in the bitstream.

The motion vector prediction unit 2512 predicts the motion vector of the current block encoded in the inter prediction mode.

The motion vector prediction unit 2512 according to an embodiment may obtain the prediction motion vector by using the motion vectors of the neighboring blocks adjacent to the current block. The locations of the neighboring blocks have been described above, and thus a detailed description thereof will be omitted.

According to an embodiment, the motion vector prediction unit 2512 selects the first neighboring block from the neighboring block. The first neighboring block may be one of the block A0, the block A1, the block B0, the block B1, and the block B2 corresponding to the neighboring blocks.

According to an embodiment, the motion vector prediction unit 2512 may select the first neighboring block mapped with the motion vector resolution of the current block from the plurality of motion vector resolutions.

The motion vector prediction unit 2512 determines the availability of the first neighboring block. In detail, the motion vector prediction unit 2512 determines the availability of the first neighboring block according to at least one of whether a tile including the first neighboring block is different from a tile including the current block, whether the first neighboring block is located outside the current picture, whether the first neighboring block has been intra-predicted, and whether reconstruction of the first neighboring block has been completed.

According to an embodiment, when it is identified from the information indicating the availability of the first neighboring block that the first neighboring block is available and the reference picture index of the first neighboring block of the same prediction direction as the prediction direction of the current block is not identical to a pre-determined value, for example when the motion vector of the first neighboring block of the same prediction direction as the prediction direction of the current block exists, the motion vector prediction unit 2512 may determine that the motion vector of the first neighboring block is available as the prediction motion vector. The pre-determined value may be, for example, −1. When the motion vector of the first neighboring block is available as the prediction motion vector, the motion vector prediction unit 2512 derives the prediction motion vector of the current block from the motion vector of the first neighboring block.

When it is identified from the information indicating the availability of the first neighboring block that the first neighboring block is not available or the reference picture index of the first neighboring block of the same prediction direction as the prediction direction of the current block is identical to the pre-determined value, it may be determined that the motion vector of the first neighboring block is not available as the prediction motion vector. In this case, the motion vector prediction unit 2512 may obtain the prediction motion vector of the current block by using the default motion vector.

According to an embodiment, when the motion vector of the first neighboring block is not available as the prediction motion vector, the motion vector prediction unit 2512 may set the motion vector of the second neighboring block at the pre-determined location as the default motion vector. In embodiments, there may be a plurality of second neighboring blocks. In this case, the motion vector of the second neighboring block may be set as the default motion vector through determination of the availability of a plurality of second neighboring blocks.

When the second neighboring block includes the block A1 and the block B1, the motion vector prediction unit 2512 may determine the availability of the block A1, and, when the block A1 is identified as being available according to information indicating whether the block A1 is available, may determine a motion vector of the block A1 as the default motion vector. When the block A1 is not available, the motion vector prediction unit 2512 may determine the availability of the block B1, and, when the block B1 is identified as being available according to information indicating whether the block B1 is available, may determine a motion vector of the block B1 as the default motion vector. In other words, the motion vector prediction unit 2512 may check whether the motion vectors of the block A1 and the block B1 may be used as the default motion vector in an order of the block A1→the block B1, or the block A1 followed by the block B1.

According to an embodiment, when the second neighboring block is identified as being available according to information indicating whether the second neighboring block is available and a reference picture index of the second neighboring block in the same prediction direction as the prediction direction of the current block is identical to a reference picture index of the current block or is not identical to a pre-determined value (i.e., when there is a motion vector of the second neighboring block in the same prediction direction as the prediction direction of the current block), the motion vector prediction unit 2512 may set the motion vector of the second neighboring block as the default motion vector.

When it is identified, from information indicating the availability of the second neighboring block, that the second neighboring block is not available or the reference picture index of the second neighboring block in the same prediction direction as the prediction direction of the current block is identical to the pre-determined value, the motion vector prediction unit 2512 may set the motion vector of the block encoded before the current block as the default motion vector.

The motion vector prediction unit 2512 may determine the motion vector of the first neighboring block or the default motion vector as the prediction motion vector of the current block.

When the motion vector of the first neighboring block is determined as the prediction motion vector and the reference picture index of the first neighboring block in the same prediction direction as the prediction direction of the current block is not identical to the reference picture index of the current block, the motion vector prediction unit 2512 may update the prediction motion vector of the current block by scaling the prediction motion vector of the current block according to the distance between the current picture and the reference picture of the current block and the distance between the current picture and the reference picture of the first neighboring block.

When the default motion vector is obtained, according to an embodiment, when the reference picture index of the second neighboring block (or for example the block decoded before the current block, which may be the block being used to obtain the default motion vector) in the same prediction direction as the prediction direction of the current block is identical to the reference picture index of the current block, the motion vector prediction unit 2512 may determine the default motion vector as the prediction motion vector of the current block. When the reference picture index of the second neighboring block (or for example the block decoded before the current block, which may be the block being used to obtain the default motion vector) in the same prediction direction as the prediction direction of the current block is not identical to the reference picture index of the current block, the motion vector prediction unit 2512 may scale the default motion vector according to the distance between the current picture and the reference picture of the current block and the distance between the current picture and the reference picture of the second neighboring block (or for example the block decoded before the current block) and may determine the scaled default motion vector as the prediction motion vector of the current block.

After the prediction motion vector of the current block is obtained, the motion vector prediction unit 2512 may adjust the prediction motion vector of the current block when the motion vector resolution of the current block is different from the pre-determined motion vector resolution (for example, the minimum motion vector resolution from among the plurality of the motion vector resolutions).

The motion vector encoding unit 2514 obtains a differential motion vector between the motion vector of the current block and the prediction motion vector. The motion vector encoding unit 2514 may obtain the differential motion vector by subtracting the prediction motion vector from the motion vector of the current block.

The bitstream generator 2530 generates a bitstream including information indicating the differential motion vector and information indicating the first neighboring block from among the neighboring blocks. As described above, the information indicating the first neighboring block may be information indicating the motion vector resolution of the current block from among the plurality of motion vector resolutions.

Figure 26:
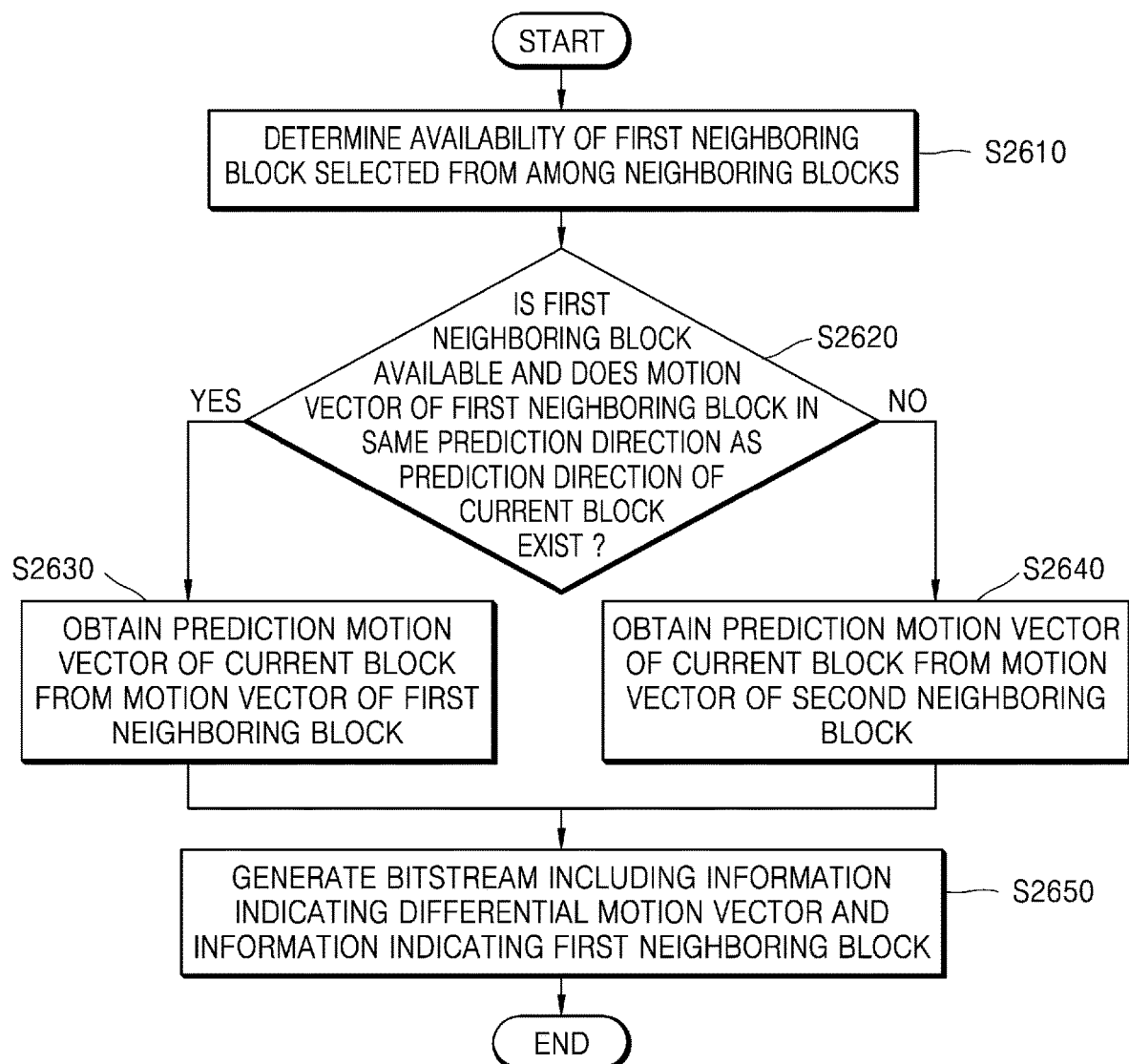
FIG. 26 is a flowchart of a method of encoding a motion vector, according to an embodiment.

FIG. 26 is a flowchart of a method of encoding a motion vector, according to an embodiment.

In operation S2610, the image encoding apparatus 2500 determines the availability of the first neighboring block selected from the neighboring blocks adjacent to the current block. According to an embodiment, the image encoding apparatus 2500 may select the first neighboring block corresponding to the motion vector resolution of the current block.

In operation S2620, the image encoding apparatus 2500 determines whether the first neighboring block is available and the motion vector of the first neighboring block of the same prediction direction as the prediction direction of the current block exists.

In operation S2630, when the first neighboring block is available and the motion vector of the first neighboring block of the same prediction direction as the prediction direction of the current block exists, the image encoding apparatus 2500 obtains the prediction motion vector of the current block from the motion vector of the first neighboring block.

In operation S2640, when the first neighboring block is not available or the motion vector of the first neighboring block of the same prediction direction as the prediction direction of the current block does not exist, the image encoding apparatus 2500 obtains the prediction motion vector of the current block from the motion vector of the second neighboring block.

When the second neighboring block is not available, the prediction motion vector of the current block may be obtained from the motion vector of the block encoded before the current block.

In operation S2650, the image encoding apparatus 2500 obtains the differential motion vector between the motion vector of the current block and the prediction motion vector, and generates the bitstream including information indicating the differential motion vector and information indicating the first neighboring block. The information indicating the first neighboring block may be information indicating the motion vector resolution of the current block from among the plurality of motion vector resolutions.

Figure 27:
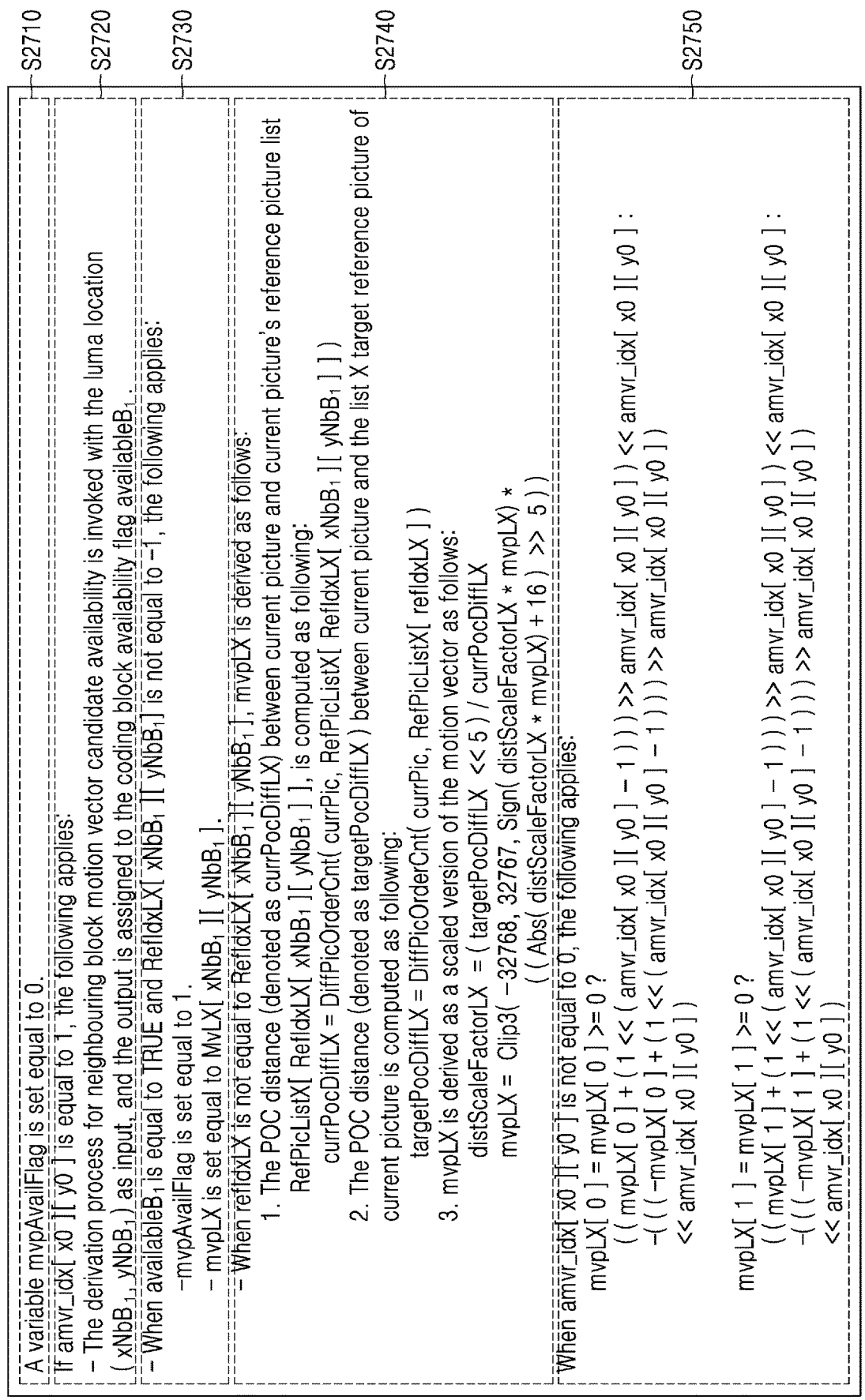
FIG. 27 is a view for explaining a process of obtaining a prediction motion vector, according to an embodiment.

FIGS. 27 and 28 are views for explaining a process of obtaining a prediction motion vector, according to an embodiment.

FIGS. 27 and 28 illustrate examples of the above-described embodiments. In FIGS. 27 and 28, LX included in mvpLX and mvLX indicate a prediction direction of a current block. In other words, when the prediction direction of the current block is a L0 direction, X is 0, and, when the prediction direction of the current block is an L1 direction, X is 1. When the prediction direction of the current block is a bidirection, X may sequentially have values of 0 and 1.

In S2710, a flag mvpAvailFlag representing the availability of the prediction motion vector is set to be 0.

In S2720, a block to be used to obtain the prediction motion vector of the current block is specified according to information amvr_idx indicating the motion vector resolution of the current block. In embodiments, a value of amvr_idx may correspond to a value of the AMVR index shown in FIG. 22. For example, when the information amvr_idx is 1, the block B1 is selected. The availability of the block B1 is determined. The determination as to the availability of the block B1 may be performed according to the above-described four conditions for determining the availability of a first neighboring block, and a result of the determination may be assigned to a coding block availability flag, which may be referred to as information availableB1. FIG. 27 illustrates only a process when amvr_idx is 1, to omit a redundant description, but blocks at different locations are selected according to the value of amvr_idx. For example, as shown in FIG. 22, a block mapped with the information amvr_idx may be selected.

In S2730, when the block B1 is identified as being available from information availableB1 indicating the availability of the block B1 and a reference picture index of the block B1, which may be represented as RefIdxLX[xNbB$_1$][yNbB$_1$] of the same prediction direction as the prediction direction of the current block is not identical to −1, the flag mvpAvailFlag representing the availability of the prediction motion vector is set to be 1, and the motion vector of the block B1, which may be represented as MvLX[xNbB$_1$][yNbB$_1$], is set to be the prediction motion vector mvpLX.

In S2740, when a reference picture index refIdxLX of the current block is not identical to a reference picture index of the block B1 RefIdxLX[xNbB$_1$][yNbB$_1$], the prediction motion vector mvpLX is scaled according to a ratio distScaleFactorLX between a picture order count (POC) distance currPocDiffLX between a current picture currPic and a reference picture RefPicListX[RefIdxLX[xNbB$_1$][yNbB$_1$]] of the block B1 and a POC distance targetPocDiffLX between the current picture and a reference picture RefPicListX[refIdxLX] of the current block. The POC distance currPocDiffLX may be a POC difference DiffPicOrderCnt between a POC of the current picture currPic and a POC of the reference picture RefPicListX[RefIdxLX[xNbB1][yNbB1]] of the block B1. The POC distance targetPocDiffLX may be a POC difference DiffPicOrderCnt between the POC of the current picture currPic and a POC of the reference picture RefPicListX[refIdxLX] of the current block.

In S2750, when amvr_idx is not 0, namely, when the motion vector resolution of the current block is different from a pre-determined motion vector resolution (for example, the minimum motion vector resolution), the prediction motion vector mvpLX is adjusted, for example using the relational expressions illustrated in FIG. 27. When amvr_idx is 0, namely, when the prediction motion vector is obtained from the motion vector of the block A1, the prediction motion vector is not adjusted.

Next, referring to FIG. 28, in S2810, when the flag mvpAvailFlag representing the availability of the prediction motion vector is 0, namely, when the block B1 is identified as not being available from the information availableB1 indicating the availability of the block B1, or the reference picture index RefIdxLX[xNbB$_1$][yNbB$_1$] of the block B1 of the same prediction direction as the prediction direction of the current block is identical to −1, a process of deriving a default motion vector DefaultMvLX (where X is 0 or 1) including S2820 through S2890 is performed.

In S2820, the availability of the block A1 and the availability of the block B1 are determined. The determinations about the availability of the block A1 and the availability of the block B1 may be performed according to the above-described four conditions for determining the availability of a first neighboring block.

In S2830, an x-axis component and a y-axis component of a default motion vector DefaultMvLX are both set to be 0.

In S2840, when the block A1 is identified as being available from a coding block availability flag, which may be referred to as information availableA1, and the reference picture index refIdxLX of the current block is identical to a reference picture index of the block A1 RefIdxLX[xNbA$_1$][yNbA$_1$], the motion vector of the block A1 is set to be the default motion vector.

In S2850, when the condition mentioned in S2840 is not satisfied, the block B1 is identified as being available from the information availableB1, and the reference picture index refIdxLX of the current block is identical to the reference picture index of the block B1 RefIdxLX[xNbB$_1$][yNbB$_1$], the motion vector of the block B1 is set to be the default motion vector.

In S2860, when the condition mentioned in S2850 is not satisfied, the block A1 is identified as being available from the information availableA1, and the reference picture index RefIdxLX[xNbA$_1$][yNbA$_1$] of the block A1 is not identical to −1, the motion vector of the block A1 is set to be the default motion vector.

In S2870, when the condition mentioned in S2860 is not satisfied, the block B1 is identified as being available from the information availableB1, and the reference picture index RefIdxLX[xNbB$_1$][yNbB$_1$] of the block B1 is not identical to −1, the motion vector of the block B1 is set to be the default motion vector.

In S2880, when the motion vector of the block A1 or the motion vector of the block B1 is not set as the default motion vector, a motion vector of a block decoded before the current block is set as the default motion vector. For example, the motion vector of the block decoded before the current block may be one of a history motion vector candidates in a history motion vector candidate list HmvpCandList. In S2880, sps_hmvp_flag may indicate whether a history motion vector predictor could be used or not for a picture sequence including the current picture.

In S2890, when the reference picture index refIdxLX of the current block is not identical to a default reference picture index DefaultRefIdxLX, the default motion vector is scaled according to a ratio distScaleFactorLX between a distance currPocDiffLX between the current picture currPic and a picture RefPicListX[DefaultRefIdxLX] indicated by the default reference picture index DefaultRefIdxLX and a distance targetPocDiffLX between the current picture and the reference picture RefPicListX[refIdxLX] of the current block. The default reference picture index DefaultRefIdxLX may refer to a reference picture index of a block used to obtain the default motion vector.

In S2895, the default motion vector DefaultMvLX is set as the prediction motion vector mvpLX of the current block.

Although not shown in FIG. 28, when amvr_idx is not 0, namely, when the motion vector resolution of the current block is different from a pre-determined motion vector resolution (for example, the minimum motion vector resolution), the prediction motion vector mvpLX is adjusted.

The above-described embodiments of the disclosure can be written as computer-executable programs, and the written computer-executable programs can be stored in a medium.

The medium may continuously store the computer-executable programs, or temporarily store the computer-executable programs for execution or downloading. Also, the medium may be any one of various recording media or storage media in which a single piece or plurality of pieces of hardware are combined, and the medium is not limited to a medium directly connected to a computer system, but may be distributed on a network. Examples of the medium include a magnetic medium (e.g., a hard disk, a floppy disk, or a magnetic tape), an optical medium (e.g., a compact disk-read-only memory (CD-ROM) or a digital versatile disk (DVD), a magneto-optical medium (e.g., a floptical disk), and a ROM, a random-access memory (RAM), and a flash memory, which are configured to store program instructions. Other examples of the medium include recording media and storage media managed by application stores distributing applications or by websites, servers, and the like supplying or distributing other various types of software.

While one or more embodiments of the disclosure have been described with reference to the figures, it will be understood by those of ordinary skill in the art that various changes in form and details may be made therein without departing from the spirit and scope as defined by the following claims.

What is claimed is:

1. A method for decoding a motion vector by an image decoding apparatus, the method comprising:
   obtaining, from a bitstream, information indicating a motion vector resolution of a current block;
   selecting a first neighboring block among a plurality of neighboring blocks adjacent to the current block using the information indicating the motion vector resolution of the current block;
   when a list among a list 0 and a list 1 comprising a reference picture referred by the current block and a list among the list 0 and the list 1 comprising a reference picture referred by the first neighboring block are same, determining a motion vector predictor of the current block using a motion vector of the first neighboring block;
   when the list comprising the reference picture referred by the current block and the list comprising the reference picture referred by the first neighboring block are different, determining a default motion vector based on a motion vector of a second neighboring block among the plurality of neighboring blocks adjacent to the current block, and determining the motion vector predictor of the current block using the default motion vector; and
   determining a motion vector of the current block using the determined motion vector predictor.

2. An image decoding apparatus, comprising at least one processor, comprising:
   an obtainer configured to obtain, from a bitstream, information indicating a motion vector resolution of a current block;
   a motion vector prediction unit configured to:
      select a first neighboring block among a plurality of neighboring blocks adjacent to the current block using the information indicating the motion vector resolution of the current block,
      when a list among a list 0 and a list 1 comprising a reference picture referred by the current block and a list among the list 0 and the list 1 comprising a reference picture referred by the first neighboring block are the same, determine a motion vector predictor of the current block using a motion vector of the first neighboring block, and when the list comprising the reference picture referred by the current block and the list comprising the reference picture referred by the first neighboring block are different, determine a default motion vector based on a motion vector of a second neighboring block among the plurality of neighboring blocks adjacent to the current block, and determine the motion vector predictor of the current block using the default motion vector; and a motion vector reconstruction unit configured to determine a motion vector of the current block using the determined motion vector predictor.

3. A method for encoding a motion vector by an image encoding apparatus, the method comprising:

determining a motion vector resolution of a current block;

selecting a first neighboring block among a plurality of neighboring blocks adjacent to the current block using the motion vector resolution of the current block;

when a list among a list 0 and a list 1 comprising a reference picture referred by the current block and a list among the list 0 and the list 1 comprising a reference picture referred by the first neighboring block are same, determining a motion vector predictor of the current block using a motion vector of the first neighboring block;

when the list comprising the reference picture referred by the current block and the list comprising the reference picture referred by the first neighboring block are different, determining a default motion vector based on a motion vector of a second neighboring block among the plurality of neighboring blocks adjacent to the current block, and determining the motion vector predictor of the current block by using the default motion vector; and generating a bitstream comprising information indicating the motion vector resolution of the current block.

4. A non-transitory computer-readable medium for recording a bitstream, the bitstream comprising:

information indicating a motion vector resolution of a current block, wherein a first neighboring block among a plurality of neighboring blocks adjacent to the current block is selected using the information indicating the motion vector resolution of the current block, when a list among a list 0 and a list 1 comprising a reference picture referred by the current block and a list among the list 0 and the list 1 comprising a reference picture referred by the first neighboring block are same, a motion vector predictor of the current block is determined using a motion vector of the first neighboring block, and when the list comprising the reference picture referred by the current block and the list comprising the reference picture referred by the first neighboring block are different, a default motion vector is determined based on a motion vector of a second neighboring block among the plurality of neighboring blocks adjacent to the current block, and the motion vector predictor of the current block is determined using the default motion vector.

* * * * *